United States Patent
Babaei

(10) Patent No.: US 12,395,907 B2
(45) Date of Patent: *Aug. 19, 2025

(54) MULTICAST BROADCAST SERVICE CONTINUITY IN CONNECTED STATE

(71) Applicant: TOYOTA JIDOSHA KABUSHIKI KAISHA, Toyota (JP)

(72) Inventor: Alireza Babaei, Fairfax, VA (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/520,021

(22) Filed: Nov. 27, 2023

(65) Prior Publication Data

US 2024/0098590 A1 Mar. 21, 2024

Related U.S. Application Data

(63) Continuation of application No. 17/465,332, filed on Sep. 2, 2021, now Pat. No. 12,096,291.
(Continued)

(51) Int. Cl.
*H04W 36/00* (2009.01)
*H04W 4/06* (2009.01)

(52) U.S. Cl.
CPC ... *H04W 36/0094* (2013.01); *H04W 36/0058* (2018.08); *H04W 36/00837* (2018.08); *H04W 36/0088* (2013.01); *H04W 4/06* (2013.01)

(58) Field of Classification Search
CPC ......... H04W 36/0094; H04W 36/0058; H04W 36/00837; H04W 36/0088; H04W 36/08
See application file for complete search history.

(56) References Cited

U.S. PATENT DOCUMENTS

| | | | |
|---|---|---|---|
| 9,485,683 | B2 | 11/2016 | Chincholi |
| 2010/0150049 | A1* | 6/2010 | Kim ............... H04W 76/12 370/312 |

(Continued)

FOREIGN PATENT DOCUMENTS

| | | |
|---|---|---|
| CN | 113840241 A | 12/2021 |
| WO | WO 2022/033680 A1 | 2/2022 |

OTHER PUBLICATIONS

3rd Generation Partnership Project, ETSI TS 138 300, "Technical Specification", 3GPP TS 38.300 Version 15.8.0, Release 15, Jan. 2020, dated Jan. 2020, 102 pages, http://www.etsi.org/standards-search.
(Continued)

*Primary Examiner* — Kenny S Lin
(74) *Attorney, Agent, or Firm* — Finnegan, Henderson, Farabow, Garrett, and Dunner, LLP

(57) ABSTRACT

A system, method and apparatus for mobile communications including is provided. A user equipment (UE) receives measurement configuration parameters including one or more first measurement configuration parameters for handover decisions associated with one or more first services, the one or more first services associated with a first type of service and one or more second measurement configuration parameters for handover decisions associated with one or more second services. The first services are associated with a first type of service and the second services are associated with a second type of service. The UE transmits one or more measurement reports that include the two types of measurement information. The UE then receives a radio resource control (RRC) reconfiguration message indicating a handover to the target cell and establishes a connection with the target cell based on the received the RRC reconfiguration message.

6 Claims, 21 Drawing Sheets

Related U.S. Application Data

(60) Provisional application No. 63/074,235, filed on Sep. 3, 2020.

(56) References Cited

U.S. PATENT DOCUMENTS

| | | |
|---|---|---|
| 2013/0107790 A1 | 5/2013 | Lee |
| 2014/0064132 A1 | 3/2014 | Liu |
| 2014/0066107 A1 | 3/2014 | Schmidt |
| 2014/0112236 A1 | 4/2014 | Jung |
| 2015/0031379 A1 | 1/2015 | Zhi |
| 2015/0162966 A1 | 6/2015 | Kim |
| 2015/0312788 A1 | 10/2015 | Delsol |
| 2016/0242055 A1 | 8/2016 | Kim |
| 2016/0330660 A1 | 11/2016 | Wong |
| 2016/0374050 A1 | 12/2016 | Prasad |
| 2016/0381517 A1 | 12/2016 | Kim |
| 2017/0188278 A1* | 6/2017 | Ohta ............ H04W 36/04 |
| 2018/0176835 A1 | 6/2018 | Park |
| 2019/0053120 A1 | 2/2019 | Park |
| 2019/0261234 A1 | 8/2019 | Park |
| 2020/0252847 A1 | 8/2020 | Park |
| 2020/0351729 A1 | 11/2020 | Rastegardoost |
| 2021/0029605 A1 | 1/2021 | Kadiri |
| 2022/0150774 A1 | 5/2022 | Wu |
| 2022/0182905 A1 | 6/2022 | Xu |
| 2022/0183049 A1* | 6/2022 | Lee ............ H04W 72/569 |
| 2022/0330125 A1 | 10/2022 | Ishii |
| 2023/0232189 A1 | 7/2023 | Kim et al. |

OTHER PUBLICATIONS

Notice of Allowance issued in U.S. Appl. No. 18/519,823, dated May 19, 2025.

* cited by examiner

| Transport channel / Logical channel | BCH | PCH | DL-SCH |
|---|---|---|---|
| BCCH | X | | |
| PCCH | | X | |
| CCCH | | | X |
| DCCH | | | X |
| DTCH | | | X |

FIG. 3A

| Transport channel / Logical channel | UL-SCH | RACH |
|---|---|---|
| CCCH | X | |
| DCCH | X | |
| DTCH | X | |

FIG. 3B

| Transport channel / Logical channel | SL-BCH | SL-SCH |
|---|---|---|
| SBCCH | X | |
| SCCH | | X |
| STCH | | X |

FIG. 3C

| Physical channel | PDSCH | PDCCH | PBCH |
|---|---|---|---|
| Transport channel | | | |
| BCH | | | X |
| PCH | X | | |
| DL-SCH | X | | |

FIG. 4A

| Physical channel | PUSCH | PUCCH | PRACH |
|---|---|---|---|
| Transport channel | | | |
| UL-SCH | X | | |
| RACH | | | X |

FIG. 4B

| Physical channel | PSSCH | PSCCH | PSFCH | PSBCH |
|---|---|---|---|---|
| Transport channel | | | | |
| SL-BCH | | | | X |
| SL-SCH | X | | | |

FIG. 4C

| Physical Signal | DM-RS | PT-RS | PRS | CSI-RS | PSS | SSS | SRS | S-PSS | S-SSS |
|---|---|---|---|---|---|---|---|---|---|
| DL | X | X | X | X | X | X | | | |
| UL | X | X | | | | | X | | |
| SL | X | X | | X | | | | X | X |

FIG. 6

MULTICAST BROADCAST SERVICE CONTINUITY IN CONNECTED STATE

CROSS-REFERENCE TO RELATED APPLICATION

This application is a continuation of U.S. patent application Ser. No. 17/465,332, filed Sep. 2, 2021, which claims the benefit of U.S. Provisional Application No. 63/074,235, entitled MULTICAST BROADCAST SERVICE CONTINUITY IN CONNECTED STATE, and filed on Sep. 3, 2020, both of which are incorporated by reference herein.

BACKGROUND

Generally described, computing devices and communication networks can be utilized to exchange information. In a common application, a computing device can request/transmit data with another computing device via the communication network. More specifically, computing devices may utilize a wireless communication network to exchange information or establish communication channels.

Wireless communication networks can include a wide variety of devices that include or access components to access a wireless communication network. Such devices can utilize the wireless communication network to facilitate interactions with other devices that can access the wireless communication network or to facilitate interaction, through the wireless communication network, with devices utilizing other communication networks.

BRIEF DESCRIPTION OF THE DRAWINGS

FIG. 3A, FIG. 3B and FIG. 3C show example mappings between logical channels and transport channels in downlink, uplink and sidelink, respectively, according to some aspects of some of various exemplary embodiments of the present disclosure.

FIG. 4A, FIG. 4B and FIG. 4C show example mappings between transport channels and physical channels in downlink, uplink and sidelink, respectively, according to some aspects of some of various exemplary embodiments of the present disclosure.

FIG. 6 shows example physical signals in downlink, uplink and sidelink according to some aspects of some of various exemplary embodiments of the present disclosure.

DETAILED DESCRIPTION

Figure 1:
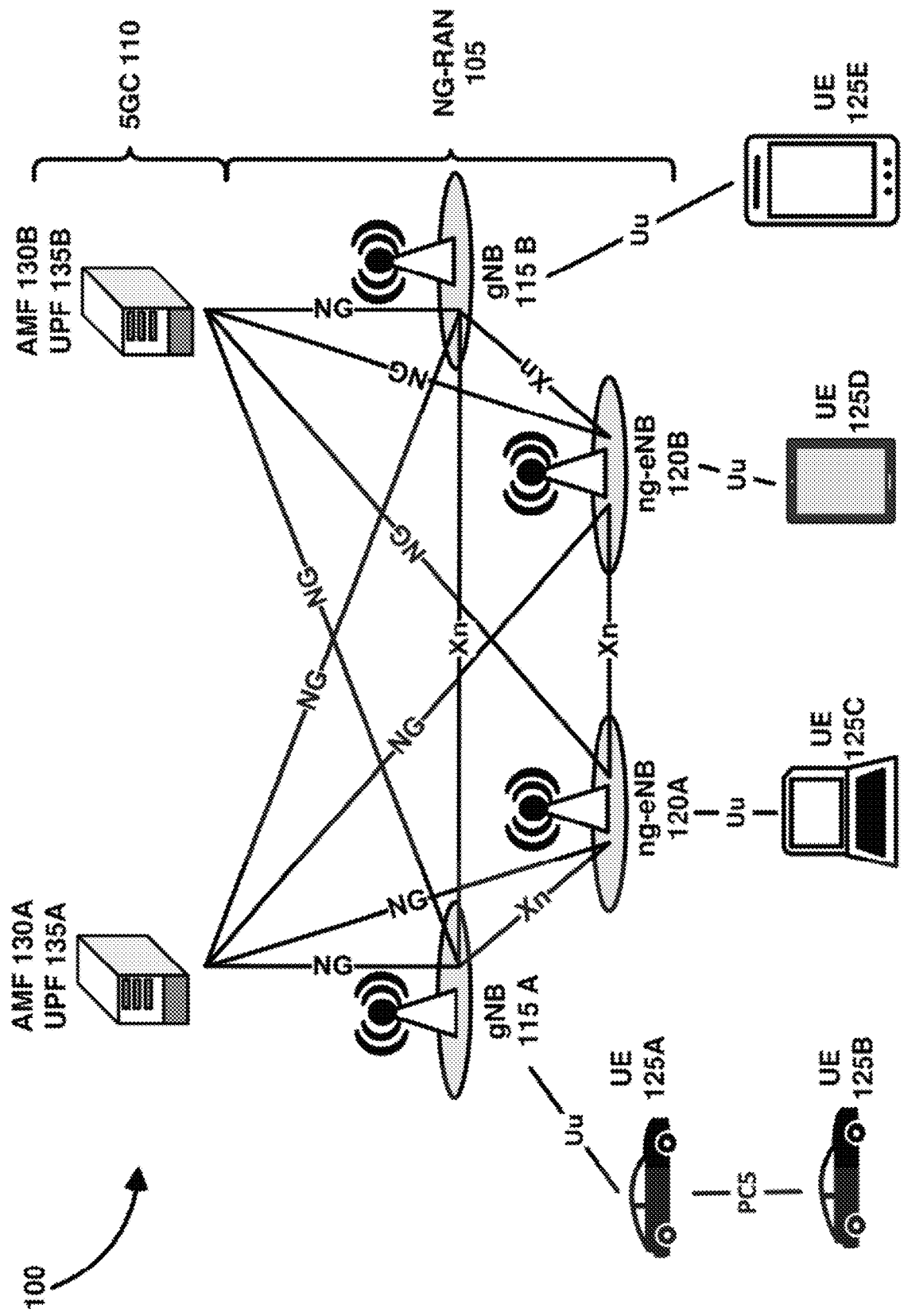
FIG. 1 shows an example of a system of mobile communications according to some aspects of some of various exemplary embodiments of the present disclosure.

FIG. 1 shows an example of a system of mobile communications 100 according to some aspects of some of various exemplary embodiments of the present disclosure. The system of mobile communication 100 may be operated by a wireless communications system operator such as a Mobile Network Operator (MNO), a private network operator, a Multiple System Operator (MSO), an Internet of Things (IOT) network operator, etc., and may offer services such as voice, data (e.g., wireless Internet access), messaging, vehicular communications services such as Vehicle to Everything (V2X) communications services, safety services, mission critical service, services in residential, commercial or industrial settings such as IoT, industrial IOT (IIOT), etc.

The system of mobile communications 100 may enable various types of applications with different requirements in terms of latency, reliability, throughput, etc. Example supported applications include enhanced Mobile Broadband (eMBB), Ultra-Reliable Low-Latency Communications (URLLC), and massive Machine Type Communications (mMTC). eMBB may support stable connections with high peak data rates, as well as moderate rates for cell-edge users. URLLC may support application with strict requirements in terms of latency and reliability and moderate requirements in terms of data rate. Example mMTC application includes a network of a massive number of IoT devices, which are only sporadically active and send small data payloads.

The system of mobile communications 100 may include a Radio Access Network (RAN) portion and a core network portion. The example shown in FIG. 1 illustrates a Next Generation RAN (NG-RAN) 105 and a 5G Core Network (5g-CN) 110 as examples of the RAN and core network, respectively. Other examples of RAN and core network may be implemented without departing from the scope of this disclosure. Other examples of RAN include Evolved Universal Terrestrial Radio Access Network (EUTRAN), Universal Terrestrial Radio Access Network (UTRAN), etc. Other examples of core network include Evolved Packet Core (EPC), UMTS Core Network (UCN), etc. The RAN implements a Radio Access Technology (RAT) and resides between User Equipments (UEs) 125 and the core network. Examples of such RATs include New Radio (NR), Long Term Evolution (LTE) also known as Evolved Universal Terrestrial Radio Access (EUTRA), Universal Mobile Telecommunication System (UMTS), etc. The RAT of the example system of mobile communications 100 may be NR. The core network resides between the RAN and one or more external networks (e.g., data networks) and is responsible for functions such as mobility management, authentication, session management, setting up bearers and application of different Quality of Services (QoSs). The functional layer between the UE 125 and the RAN (e.g., the NG-RAN 105) may be referred to as Access Stratum (AS) and the functional layer between the UE 125 and the core network (e.g., the 5G-CN 110) may be referred to as Non-access Stratum (NAS).

The UEs 125 may include wireless transmission and reception means for communications with one or more nodes in the RAN, one or more relay nodes, or one or more other UEs, etc. Example of UEs include, but are not limited to, smartphones, tablets, laptops, computers, wireless transmission and/or reception units in a vehicle, V2X or Vehicle to Vehicle (V2V) devices, wireless sensors, IoT devices, IIOT devices, etc. Other names may be used for UEs such as a Mobile Station (MS), terminal equipment, terminal node, client device, mobile device, etc. Still further, UEs 125 may also include components or subcomponents integrated into other devices, such as vehicles, to provide wireless communication functionality with nodes in the RAN as described herein. Such other devices may have other functionality or multiple functionalities in addition to wireless communications.

The RAN may include nodes (e.g., base stations) for communications with the UEs. For example, the NG-RAN 105 of the system of mobile communications 100 may comprise nodes for communications with the UEs 125. Different name for the RAN nodes may be used, for example depending on the RAT used for the RAN. A RAN node may be referred to as Node B (NB) in a RAN that used the UMTS RAT. A RAN node may be referred to as an evolved Node B (eNB) in a RAN that uses LTE/EUTRA RAT. For the illustrative example of the system of mobile communications 100 in FIG. 1, the nodes of an NG-RAN 105 may be either a next generation Node B (gNB) 115 or a next generation evolved Node B (ng-eNB) 120. In this specification, the terms base station, RAN node, gNB and ng-eNB may be used interchangeably. Illustratively, a communication network may be characterized as a set of geographic areas, referred to as cells, which may be logically organized in a contingent manner. The cells are organized in a manner such that individual cells may be associated with one or more base stations that establish wireless communications with a plurality of UEs. The base stations may be physically located within an individual cell such that wireless radio signals transmitted from the cell may be received by UEs also physically within the cell. In other embodiments, base stations may be located outside of the physical cell may be configured to transmit wireless signals to UEs within the cell. In some embodiments, individual UEs may be able to receive signals transmitted between adjacent cells due to overlapping signal coverage. In accordance, reference to communications from a target cell or existing cell can refer to connections between one or more base stations attributed to the cell and a UE 125.

The gNB 115 may provide NR user plane and control plane protocol terminations towards the UE 125. The ng-eNB 120 may provide E-UTRA user plane and control plane protocol terminations towards the UE 125. An interface between the gNB 115 and the UE 125 or between the ng-eNB 120 and the UE 125 may be referred to as a Uu interface. The Uu interface may be established with a user plane protocol stack and a control plane protocol stack. For a Uu interface, the direction from the base station (e.g., the gNB 115 or the ng-eNB 120) to the UE 125 may be referred to as downlink and the direction from the UE 125 to the base station (e.g., gNB 115 or ng-eNB 120) may be referred to as uplink.

The gNBs 115 and ng-eNBs 120 may be interconnected with each other by means of an Xn interface. The Xn interface may comprise an Xn User plane (Xn-U) interface and an Xn Control plane (Xn-C) interface. The transport network layer of the Xn-U interface may be built on Internet Protocol (IP) transport and GPRS Tunneling Protocol (GTP) may be used on top of User Datagram Protocol (UDP)/IP to carry the user plane protocol data units (PDUs). Xn-U may provide non-guaranteed delivery of user plane PDUs and may support data forwarding and flow control. The transport network layer of the Xn-C interface may be built on Stream Control Transport Protocol (SCTP) on top of IP. The application layer signaling protocol may be referred to as XnAP (Xn Application Protocol). The SCTP layer may provide the guaranteed delivery of application layer messages. In the transport IP layer, point-to-point transmission may be used to deliver the signaling PDUs. The Xn-C interface may support Xn interface management, UE mobility management, including context transfer and RAN paging, and dual connectivity.

The gNBs 115 and ng-eNBs 120 may also be connected to the 5GC 110 by means of the NG interfaces, more specifically to an Access and Mobility Management Function (AMF) 130 of the 5GC 110 by means of the NG-C interface and to a User Plane Function (UPF) 135 of the 5GC 110 by means of the NG-U interface. The transport network layer of the NG-U interface may be built on IP transport and GTP protocol may be used on top of UDP/IP to carry the user plane PDUs between the NG-RAN node (e.g., gNB 115 or ng-eNB 120) and the UPF 135. NG-U may provide non-guaranteed delivery of user plane PDUs between the NG-RAN node and the UPF. The transport network layer of the NG-C interface may be built on IP transport. For the reliable transport of signaling messages, SCTP may be added on top of IP. The application layer signaling protocol may be referred to as NGAP (NG Application Protocol). The SCTP layer may provide guaranteed delivery of application layer messages. In the transport, IP layer point-to-point transmission may be used to deliver the signaling PDUs. The NG-C interface may provide the following functions: NG interface management; UE context management; UE mobility management; transport of NAS messages; paging; PDU Session Management; configuration transfer; and warning message transmission.

The gNB 115 or the ng-eNB 120 may host one or more of the following functions: Radio Resource Management functions such as Radio Bearer Control, Radio Admission Control, Connection Mobility Control, Dynamic allocation of resources to UEs in both uplink and downlink (e.g., scheduling); IP and Ethernet header compression, encryption and integrity protection of data; Selection of an AMF at UE attachment when no routing to an AMF can be determined from the information provided by the UE; Routing of User Plane data towards UPF(s); Routing of Control Plane information towards AMF; Connection setup and release; Scheduling and transmission of paging messages; Scheduling and transmission of system broadcast information (e.g., originated from the AMF); Measurement and measurement reporting configuration for mobility and scheduling; Transport level packet marking in the uplink; Session Management; Support of Network Slicing; QoS Flow management and mapping to data radio bearers; Support of UEs in RRC Inactive state; Distribution function for NAS messages; Radio access network sharing; Dual Connectivity; Tight interworking between NR and E-UTRA; and Maintaining security and radio configuration for User Plane 5G system (5GS) Cellular IoT (CIoT) Optimization.

The AMF 130 may host one or more of the following functions: NAS signaling termination; NAS signaling security; AS Security control; Inter CN node signaling for mobility between 3GPP access networks; Idle mode UE Reachability (including control and execution of paging retransmission); Registration Area management; Support of intra-system and inter-system mobility; Access Authentication; Access Authorization including check of roaming rights; Mobility management control (subscription and policies); Support of Network Slicing; Session Management Function (SMF) selection; Selection of 5GS CIoT optimizations.

The UPF 135 may host one or more of the following functions: Anchor point for Intra-/Inter-RAT mobility (when applicable); External PDU session point of interconnect to Data Network; Packet routing 86 forwarding; Packet inspection and User plane part of Policy rule enforcement; Traffic usage reporting; Uplink classifier to support routing traffic flows to a data network; Branching point to support multi-homed PDU session; QoS handling for user plane, e.g. packet filtering, gating, UL/DL rate enforcement; Uplink Traffic verification (Service Data Flow (SDF) to QoS flow mapping); Downlink packet buffering and downlink data notification triggering.

As shown in FIG. 1, the NG-RAN 105 may support the PC5 interface between two UEs 125 (e.g., UE 125A and UE125B). In the PC5 interface, the direction of communications between two UEs (e.g., from UE 125A to UE 125B or vice versa) may be referred to as sidelink. Sidelink transmission and reception over the PC5 interface may be supported when the UE 125 is inside NG-RAN 105 coverage, irrespective of which RRC state the UE is in, and when the UE 125 is outside NG-RAN 105 coverage. Support of V2X services via the PC5 interface may be provided by NR sidelink communication and/or V2X sidelink communication.

PC5-S signaling may be used for unicast link establishment with Direct Communication Request/Accept message. A UE may self-assign its source Layer-2 ID for the PC5 unicast link for example based on the V2X service type. During unicast link establishment procedure, the UE may send its source Layer-2 ID for the PC5 unicast link to the peer UE, e.g., the UE for which a destination ID has been received from the upper layers. A pair of source Layer-2 ID and destination Layer-2 ID may uniquely identify a unicast link. The receiving UE may verify that the said destination ID belongs to it and may accept the Unicast link establishment request from the source UE. During the PC5 unicast link establishment procedure, a PC5-RRC procedure on the Access Stratum may be invoked for the purpose of UE sidelink context establishment as well as for AS layer configurations, capability exchange etc. PC5-RRC signaling may enable exchanging UE capabilities and AS layer configurations such as Sidelink Radio Bearer configurations between pair of UEs for which a PC5 unicast link is established.

NR sidelink communication may support one of three types of transmission modes (e.g., Unicast transmission, Groupcast transmission, and Broadcast transmission) for a pair of a Source Layer-2 ID and a Destination Layer-2 ID in the AS. The Unicast transmission mode may be characterized by: Support of one PC5-RRC connection between peer UEs for the pair; Transmission and reception of control information and user traffic between peer UEs in sidelink; Support of sidelink HARQ feedback; Support of sidelink transmit power control; Support of RLC Acknowledged Mode (AM); and Detection of radio link failure for the PC5-RRC connection. The Groupcast transmission may be characterized by: Transmission and reception of user traffic among UEs belonging to a group in sidelink; and Support of sidelink HARQ feedback. The Broadcast transmission may be characterized by: Transmission and reception of user traffic among UEs in sidelink.

A Source Layer-2 ID, a Destination Layer-2 ID and a PC5 Link Identifier may be used for NR sidelink communication. The Source Layer-2 ID may identify the sender of the data in NR sidelink communication. The Source Layer-2 ID may be 24 bits long and may be split in the MAC layer into two bit strings: One bit string may be the LSB part (8 bits) of Source Layer-2 ID and forwarded to physical layer of the sender. This may identify the source of the intended data in sidelink control information and may be used for filtering of packets at the physical layer of the receiver; and the Second bit string may be the MSB part (16 bits) of the Source Layer-2 ID and may be carried within the Medium Access Control (MAC) header. This may be used for filtering of packets at the MAC layer of the receiver. The Destination Layer-2 ID may identify the target of the data in NR sidelink communication. For NR sidelink communication, the Destination Layer-2 ID may be 24 bits long and may be split in the MAC layer into two bit strings: One bit string may be the LSB part (16 bits) of Destination Layer-2 ID and forwarded to physical layer of the sender. This may identify the target of the intended data in sidelink control information and may be used for filtering of packets at the physical layer of the receiver; and the Second bit string may be the MSB part (8 bits) of the Destination Layer-2 ID and may be carried within the MAC header. This may be used for filtering of packets at the MAC layer of the receiver. The PC5 Link Identifier may uniquely identify the PC5 unicast link in a UE for the lifetime of the PC5 unicast link. The PC5 Link Identifier may be used to indicate the PC5 unicast link whose sidelink Radio Link failure (RLF) declaration was made and PC5-RRC connection was released.

Figure 2A:
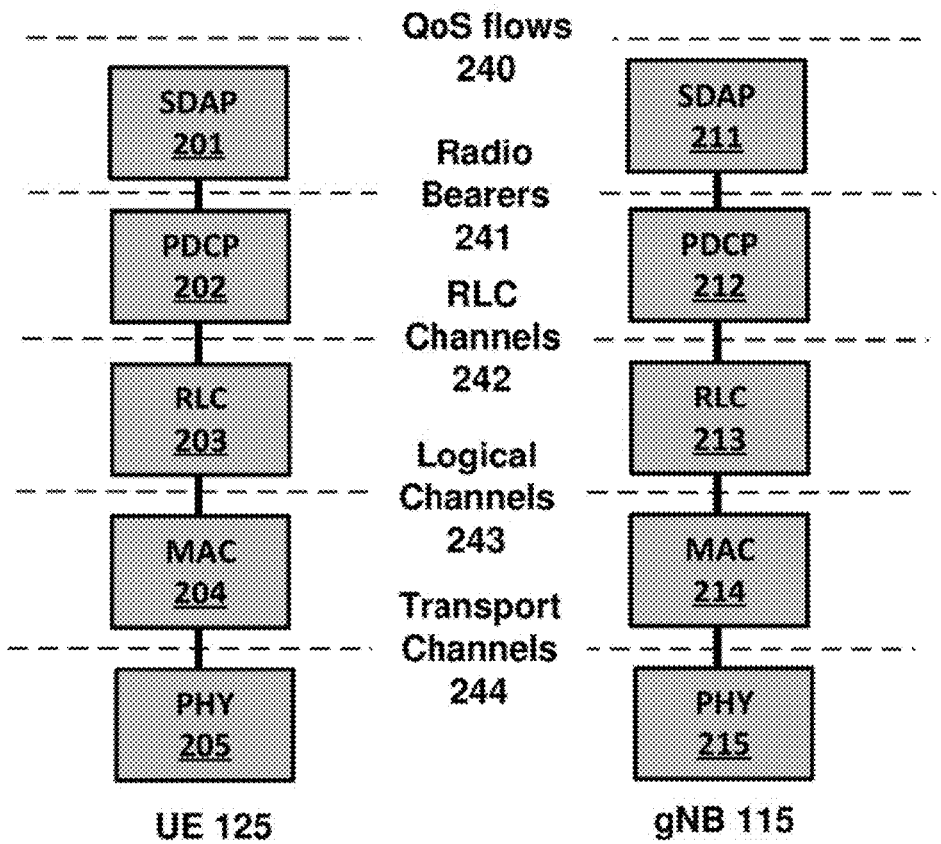
FIG. 2A and FIG. 2B show examples of radio protocol stacks for user plane and control plane, respectively, according to some aspects of some of various exemplary embodiments of the present disclosure.
Figure 2B:
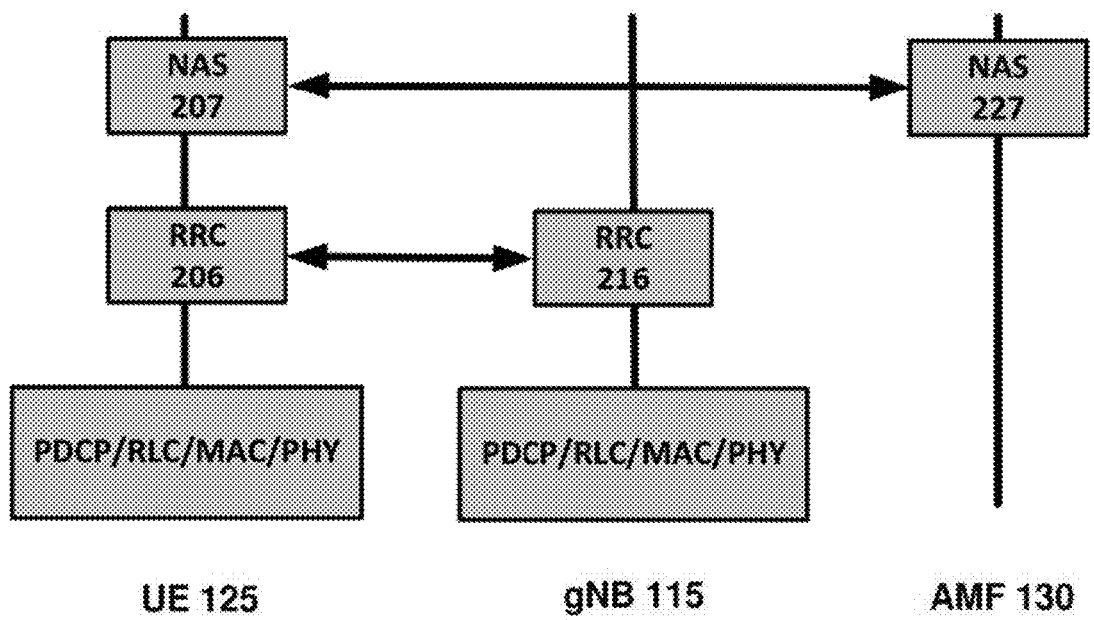

FIG. 2A and FIG. 2B show examples of radio protocol stacks for user plane and control plane, respectively, according to some aspects of some of various exemplary embodiments of the present disclosure. As shown in FIG. 2A, the protocol stack for the user plane of the Uu interface (between the UE 125 and the gNB 115) includes Service Data Adaptation Protocol (SDAP) 201 and SDAP 211, Packet Data Convergence Protocol (PDCP) 202 and PDCP 212, Radio Link Control (RLC) 203 and RLC 213, MAC 204 and MAC 214 sublayers of layer 2 and Physical (PHY) 205 and PHY 215 layer (layer 1 also referred to as L1).

The PHY 205 and PHY 215 offer transport channels 244 to the MAC 204 and MAC 214 sublayer. The MAC 204 and MAC 214 sublayer offer logical channels 243 to the RLC 203 and RLC 213 sublayer. The RLC 203 and RLC 213 sublayer offer RLC channels 242 to the PDCP 202 and PCP 212 sublayer. The PDCP 202 and PDCP 212 sublayer offer radio bearers 241 to the SDAP 201 and SDAP 211 sublayer. Radio bearers may be categorized into two groups: Data Radio Bearers (DRBs) for user plane data and Signaling Radio Bearers (SRBs) for control plane data. The SDAP 201 and SDAP 211 sublayer offers QoS flows 240 to 5GC.

The main services and functions of the MAC 204 or MAC 214 sublayer include: mapping between logical channels and transport channels; Multiplexing/demultiplexing of MAC Service Data Units (SDUs) belonging to one or different logical channels into/from Transport Blocks (TB) delivered to/from the physical layer on transport channels; Scheduling information reporting; Error correction through Hybrid Automatic Repeat Request (HARQ) (one HARQ entity per cell in case of carrier aggregation (CA)); Priority handling between UEs by means of dynamic scheduling; Priority handling between logical channels of one UE by means of Logical Channel Prioritization (LCP); Priority handling between overlapping resources of one UE; and Padding. A single MAC entity may support multiple numerologies, transmission timings and cells. Mapping restrictions in logical channel prioritization control which numerology(ies), cell(s), and transmission timing(s) a logical channel may use.

The HARQ functionality may ensure delivery between peer entities at Layer 1. A single HARQ process may support one TB when the physical layer is not configured for downlink/uplink spatial multiplexing, and when the physical layer is configured for downlink/uplink spatial multiplexing, a single HARQ process may support one or multiple TBs.

The RLC 203 or RLC 213 sublayer may support three transmission modes: Transparent Mode (TM); Unacknowledged Mode (UM); and Acknowledged Mode (AM). The RLC configuration may be per logical channel with no dependency on numerologies and/or transmission durations, and Automatic Repeat Request (ARQ) may operate on any of the numerologies and/or transmission durations the logical channel is configured with.

The main services and functions of the RLC 203 or RLC 213 sublayer depend on the transmission mode (e.g., TM, UM or AM) and may include: Transfer of upper layer PDUs; Sequence numbering independent of the one in PDCP (UM and AM); Error Correction through ARQ (AM only); Segmentation (AM and UM) and re-segmentation (AM only) of RLC SDUs; Reassembly of SDU (AM and UM); Duplicate Detection (AM only); RLC SDU discard (AM and UM); RLC re-establishment; and Protocol error detection (AM only).

The automatic repeat request within the RLC 203 or RLC 213 sublayer may have the following characteristics: ARQ retransmits RLC SDUs or RLC SDU segments based on RLC status reports; Polling for RLC status report may be used when needed by RLC; RLC receiver may also trigger RLC status report after detecting a missing RLC SDU or RLC SDU segment.

The main services and functions of the PDCP 202 or PDCP 212 sublayer may include: Transfer of data (user plane or control plane); Maintenance of PDCP Sequence Numbers (SNs); Header compression and decompression using the Robust Header Compression (ROHC) protocol; Header compression and decompression using EHC protocol; Ciphering and deciphering; Integrity protection and integrity verification; Timer based SDU discard; Routing for split bearers; Duplication; Reordering and in-order delivery; Out-of-order delivery; and Duplicate discarding.

The main services and functions of SDAP 201 or SDAP 211 include: Mapping between a QoS flow and a data radio bearer; and Marking QoS Flow ID (QFI) in both downlink and uplink packets. A single protocol entity of SDAP may be configured for each individual PDU session.

As shown in FIG. 2B, the protocol stack of the control plane of the Uu interface (between the UE 125 and the gNB 115) includes PHY layer (layer 1), and MAC, RLC and PDCP sublayers of layer 2 as described above and in addition, the RRC 206 sublayer and RRC 216 sublayer. The main services and functions of the RRC 206 sublayer and the RRC 216 sublayer over the Uu interface include: Broadcast of System Information related to AS and NAS; Paging initiated by 5GC or NG-RAN; Establishment, maintenance and release of an RRC connection between the UE and NG-RAN (including Addition, modification and release of carrier aggregation; and Addition, modification and release of Dual Connectivity in NR or between E-UTRA and NR); Security functions including key management; Establishment, configuration, maintenance and release of SRBs and DRBs; Mobility functions (including Handover and context transfer; UE cell selection and reselection and control of cell selection and reselection; and Inter-RAT mobility); QoS management functions; UE measurement reporting and control of the reporting; Detection of and recovery from radio link failure; and NAS message transfer to/from NAS from/to UE. The NAS 207 and NAS 227 layer is a control protocol (terminated in AMF on the network side) that performs the functions such as authentication, mobility management, security control, etc.

The sidelink specific services and functions of the RRC sublayer over the Uu interface include: Configuration of sidelink resource allocation via system information or dedicated signaling; Reporting of UE sidelink information; Measurement configuration and reporting related to sidelink; and Reporting of UE assistance information for SL traffic pattern(s).

FIG. 3A, FIG. 3B and FIG. 3C show example mappings between logical channels and transport channels in downlink, uplink and sidelink, respectively, according to some aspects of some of various exemplary embodiments of the present disclosure. Different kinds of data transfer services may be offered by MAC. Each logical channel type may be defined by what type of information is transferred. Logical channels may be classified into two groups: Control Channels and Traffic Channels. Control channels may be used for the transfer of control plane information only. The Broadcast Control Channel (BCCH) is a downlink channel for broadcasting system control information. The Paging Control Channel (PCCH) is a downlink channel that carries paging messages. The Common Control Channel (CCCH) is channel for transmitting control information between UEs and network. This channel may be used for UEs having no RRC connection with the network. The Dedicated Control Channel (DCCH) is a point-to-point bi-directional channel that transmits dedicated control information between a UE and the network and may be used by UEs having an RRC connection. Traffic channels may be used for the transfer of user plane information only. The Dedicated Traffic Channel (DTCH) is a point-to-point channel, dedicated to one UE, for the transfer of user information. A DTCH may exist in both uplink and downlink. Sidelink Control Channel (SCCH) is a sidelink channel for transmitting control information (e.g., PC5-RRC and PC5-S messages) from one UE to other UE(s). Sidelink Traffic Channel (STCH) is a sidelink channel for transmitting user information from one UE to other UE(s). Sidelink Broadcast Control Channel (SBCCH) is a sidelink channel for broadcasting sidelink system information from one UE to other UE(s).

The downlink transport channel types include Broadcast Channel (BCH), Downlink Shared Channel (DL-SCH), and Paging Channel (PCH). The BCH may be characterized by: fixed, pre-defined transport format; and requirement to be broadcast in the entire coverage area of the cell, either as a single message or by beamforming different BCH instances. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; and the support for UE Discontinuous Reception (DRX) to enable UE power saving. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; support for UE discontinuous reception (DRX) to enable UE power saving. The PCH may be characterized by: support for UE discontinuous reception (DRX) to enable UE power saving (DRX cycle is indicated by the network to the UE); requirement to be broadcast in the entire coverage area of the cell, either as a single message or by beamforming different BCH instances; mapped to physical resources which can be used dynamically also for traffic/other control channels.

In downlink, the following connections between logical channels and transport channels may exist: BCCH may be mapped to BCH; BCCH may be mapped to DL-SCH; PCCH may be mapped to PCH; CCCH may be mapped to DL-SCH; DCCH may be mapped to DL-SCH; and DTCH may be mapped to DL-SCH.

The uplink transport channel types include Uplink Shared Channel (UL-SCH) and Random Access Channel(s) (RACH). The UL-SCH may be characterized by possibility to use beamforming; support for dynamic link adaptation by varying the transmit power and potentially modulation and coding; support for HARQ; support for both dynamic and semi-static resource allocation. The RACH may be characterized by limited control information; and collision risk.

In Uplink, the following connections between logical channels and transport channels may exist: CCCH may be mapped to UL-SCH; DCCH may be mapped to UL-SCH; and DTCH may be mapped to UL-SCH.

The sidelink transport channel types include: Sidelink broadcast channel (SL-BCH) and Sidelink shared channel (SL-SCH). The SL-BCH may be characterized by pre-defined transport format. The SL-SCH may be characterized by support for unicast transmission, groupcast transmission and broadcast transmission; support for both UE autonomous resource selection and scheduled resource allocation by NG-RAN; support for both dynamic and semi-static resource allocation when UE is allocated resources by the NG-RAN; support for HARQ; and support for dynamic link adaptation by varying the transmit power, modulation and coding.

In the sidelink, the following connections between logical channels and transport channels may exist: SCCH may be mapped to SL-SCH; STCH may be mapped to SL-SCH; and SBCCH may be mapped to SL-BCH.

FIG. 4A, FIG. 4B and FIG. 4C show example mappings between transport channels and physical channels in downlink, uplink and sidelink, respectively, according to some aspects of some of various exemplary embodiments of the present disclosure. The physical channels in downlink include Physical Downlink Shared Channel (PDSCH), Physical Downlink Control Channel (PDCCH) and Physical Broadcast Channel (PBCH). The PCH and DL-SCH transport channels are mapped to the PDSCH. The BCH transport channel is mapped to the PBCH. A transport channel is not mapped to the PDCCH but Downlink Control Information (DCI) is transmitted via the PDCCH.

The physical channels in the uplink include Physical Uplink Shared Channel (PUSCH), Physical Uplink Control Channel (PUCCH) and Physical Random Access Channel (PRACH). The UL-SCH transport channel may be mapped to the PUSCH and the RACH transport channel may be mapped to the PRACH. A transport channel is not mapped to the PUCCH but Uplink Control Information (UCI) is transmitted via the PUCCH.

The physical channels in the sidelink include Physical Sidelink Shared Channel (PSSCH), Physical Sidelink Control Channel (PSCCH), Physical Sidelink Feedback Channel (PSFCH) and Physical Sidelink Broadcast Channel (PSBCH). The Physical Sidelink Control Channel (PSCCH) may indicate resource and other transmission parameters used by a UE for PSSCH. The Physical Sidelink Shared Channel (PSSCH) may transmit the TBs of data themselves, and control information for HARQ procedures and CSI feedback triggers, etc. At least 6 OFDM symbols within a slot may be used for PSSCH transmission. Physical Sidelink Feedback Channel (PSFCH) may carry the HARQ feedback over the sidelink from a UE which is an intended recipient of a PSSCH transmission to the UE which performed the transmission. PSFCH sequence may be transmitted in one PRB repeated over two OFDM symbols near the end of the sidelink resource in a slot. The SL-SCH transport channel may be mapped to the PSSCH. The SL-BCH may be mapped to PSBCH. No transport channel is mapped to the PSFCH but Sidelink Feedback Control Information (SFCI) may be mapped to the PSFCH. No transport channel is mapped to PSCCH but Sidelink Control Information (SCI) may be mapped to the PSCCH.

Figure 5A:
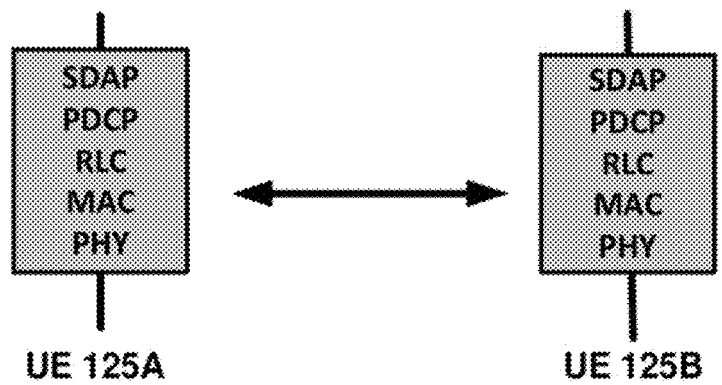
FIG. 5A, FIG. 5B, FIG. 5C and FIG. 5D show examples of radio protocol stacks for NR sidelink communication according to some aspects of some of various exemplary embodiments of the present disclosure.
Figure 5B:
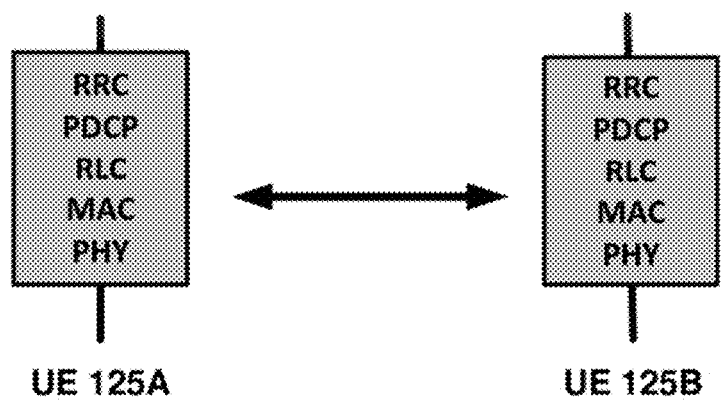
Figure 5C:
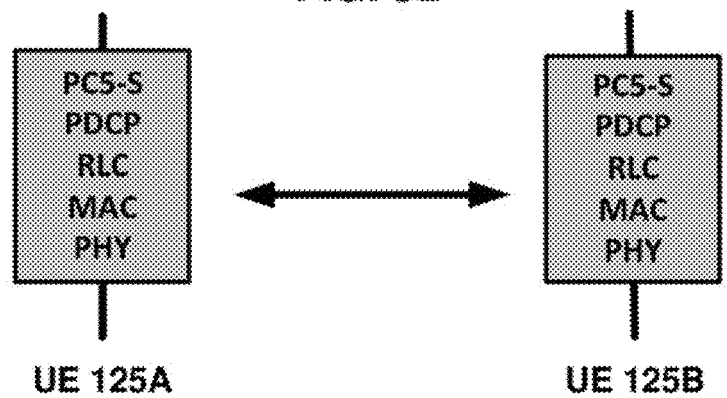
Figure 5D:
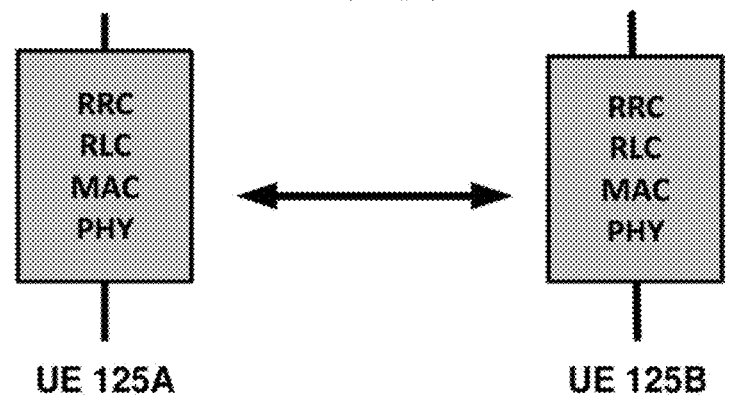

FIG. 5A, FIG. 5B, FIG. 5C and FIG. 5D show examples of radio protocol stacks for NR sidelink communication according to some aspects of some of various exemplary embodiments of the present disclosure. The AS protocol stack for user plane in the PC5 interface (i.e., for STCH) may consist of SDAP, PDCP, RLC and MAC sublayers, and the physical layer. The protocol stack of user plane is shown in FIG. 5A. The AS protocol stack for SBCCH in the PC5 interface may consist of RRC, RLC, MAC sublayers, and the physical layer as shown below in FIG. 5B. For support of PC5-S protocol, PC5-S is located on top of PDCP, RLC and MAC sublayers, and the physical layer in the control plane protocol stack for SCCH for PC5-S, as shown in FIG. 5C. The AS protocol stack for the control plane for SCCH for RRC in the PC5 interface consists of RRC, PDCP, RLC and MAC sublayers, and the physical layer. The protocol stack of control plane for SCCH for RRC is shown in FIG. 5D.

The Sidelink Radio Bearers (SLRBs) may be categorized into two groups: Sidelink Data Radio Bearers (SL DRB) for user plane data and Sidelink Signaling Radio Bearers (SL SRB) for control plane data. Separate SL SRBs using different SCCHs may be configured for PC5-RRC and PC5-S signaling, respectively.

The MAC sublayer may provide the following services and functions over the PC5 interface: Radio resource selection; Packet filtering; Priority handling between uplink and sidelink transmissions for a given UE; and Sidelink CSI reporting. With logical channel prioritization restrictions in MAC, only sidelink logical channels belonging to the same destination may be multiplexed into a MAC PDU for every unicast, groupcast and broadcast transmission which may be associated to the destination. For packet filtering, a SL-SCH MAC header including portions of both Source Layer-2 ID and a Destination Layer-2 ID may be added to a MAC PDU. The Logical Channel Identifier (LCID) included within a MAC subheader may uniquely identify a logical channel within the scope of the Source Layer-2 ID and Destination Layer-2 ID combination.

The services and functions of the RLC sublayer may be supported for sidelink. Both RLC Unacknowledged Mode (UM) and Acknowledged Mode (AM) may be used in unicast transmission while only UM may be used in groupcast or broadcast transmission. For UM, only unidirectional transmission may be supported for groupcast and broadcast.

The services and functions of the PDCP sublayer for the Uu interface may be supported for sidelink with some restrictions: Out-of-order delivery may be supported only for unicast transmission; and Duplication may not be supported over the PC5 interface.

The SDAP sublayer may provide the following service and function over the PC5 interface: Mapping between a QoS flow and a sidelink data radio bearer. There may be one SDAP entity per destination for one of unicast, groupcast and broadcast which is associated to the destination.

The RRC sublayer may provide the following services and functions over the PC5 interface: Transfer of a PC5-RRC message between peer UEs; Maintenance and release of a PC5-RRC connection between two UEs; and Detection of sidelink radio link failure for a PC5-RRC connection based on indication from MAC or RLC. A PC5-RRC connection may be a logical connection between two UEs for a pair of Source and Destination Layer-2 IDs which may be considered to be established after a corresponding PC5 unicast link is established. There may be one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages may be used for a UE to transfer UE capability and sidelink configuration including SL-DRB configuration to the peer UE. Both peer UEs may exchange their own UE capability and sidelink configuration using separate bi-directional procedures in both sidelink directions.

FIG. 6 shows example physical signals in downlink, uplink and sidelink according to some aspects of some of various exemplary embodiments of the present disclosure. The Demodulation Reference Signal (DM-RS) may be used in downlink, uplink and sidelink and may be used for channel estimation. DM-RS is a UE-specific reference signal and may be transmitted together with a physical channel in downlink, uplink or sidelink and may be used for channel estimation and coherent detection of the physical channel. The Phase Tracking Reference Signal (PT-RS) may be used in downlink, uplink and sidelink and may be used for tracking the phase and mitigating the performance loss due to phase noise. The PT-RS may be used mainly to estimate and minimize the effect of Common Phase Error (CPE) on system performance. Due to the phase noise properties, PT-RS signal may have a low density in the frequency domain and a high density in the time domain. PT-RS may occur in combination with DM-RS and when the network has configured PT-RS to be present. The Positioning Reference Signal (PRS) may be used in downlink for positioning using different positioning techniques. PRS may be used to measure the delays of the downlink transmissions by correlating the received signal from the base station with a local replica in the receiver. The Channel State Information Reference Signal (CSI-RS) may be used in downlink and sidelink. CSI-RS may be used for channel state estimation, Reference Signal Received Power (RSRP) measurement for mobility and beam management, time/frequency tracking for demodulation among other uses. CSI-RS may be configured UE-specifically but multiple users may share the same CSI-RS resource. The UE may determine CSI reports and transit them in the uplink to the base station using PUCCH or PUSCH. The CSI report may be carried in a sidelink MAC CE. The Primary Synchronization Signal (PSS) and the Secondary Synchronization Signal (SSS) may be used for radio fame synchronization. The PSS and SSS may be used for the cell search procedure during the initial attach or for mobility purposes. The Sounding Reference Signal (SRS) may be used in uplink for uplink channel estimation. Similar to CSI-RS, the SRS may serve as QCL reference for other physical channels such that they can be configured and transmitted quasi-collocated with SRS. The Sidelink PSS (S-PSS) and Sidelink SSS (S-SSS) may be used in sidelink for sidelink synchronization.

Figure 7:
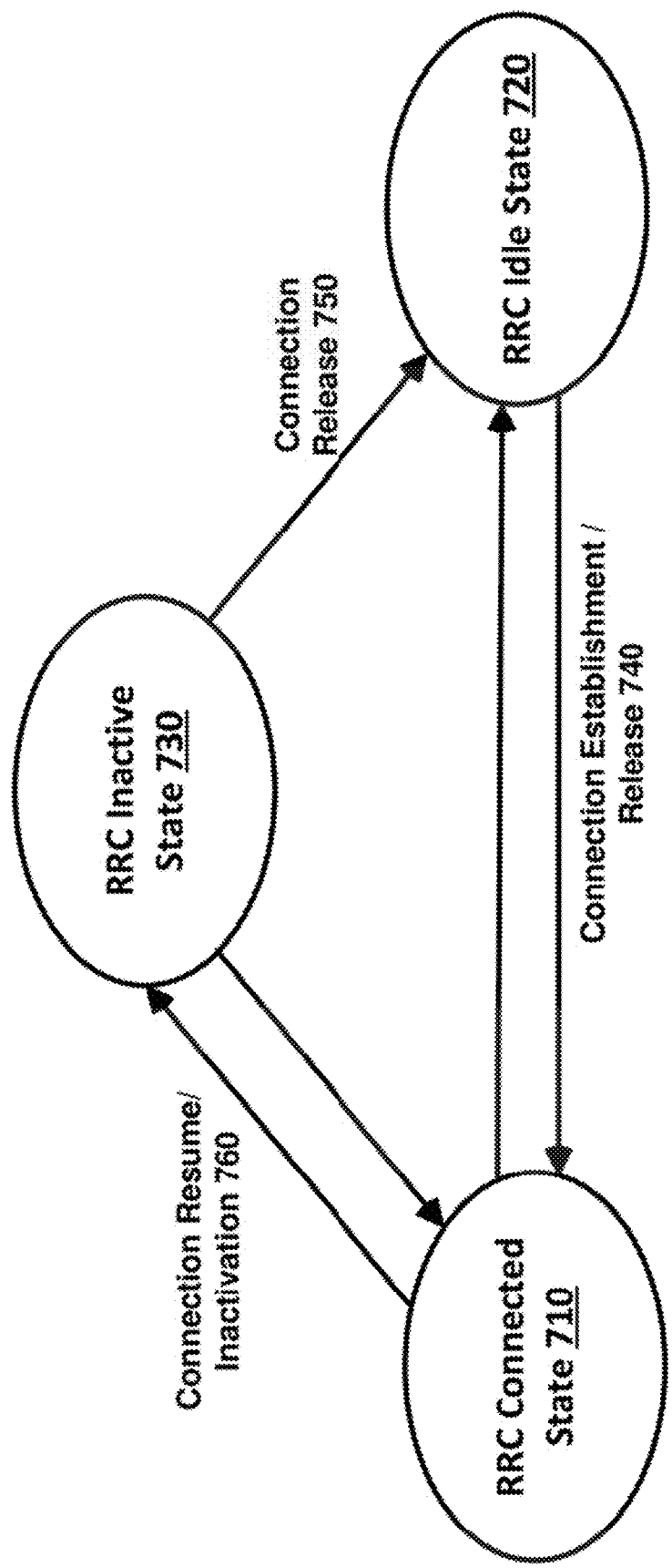
FIG. 7 shows examples of Radio Resource Control (RRC) states and transitioning between different RRC states according to some aspects of some of various exemplary embodiments of the present disclosure.

FIG. 7 shows examples of Radio Resource Control (RRC) states and transitioning between different RRC states according to some aspects of some of various exemplary embodiments of the present disclosure. A UE may be in one of three RRC states: RRC Connected State 710, RRC Idle State 720 and RRC Inactive state 730. After power up, the UE may be in RRC Idle state 720 and the UE may establish connection with the network using initial access and via an RRC connection establishment procedure to perform data transfer and/or to make/receive voice calls. Once RRC connection is established, the UE may be in RRC Connected State 710. The UE may transition from the RRC Idle state 720 to the RRC connected state 710 or from the RRC Connected State 710 to the RRC Idle state 720 using the RRC connection Establishment/Release procedures 740.

To reduce the signaling load and the latency resulting from frequent transitioning from the RRC Connected State 710 to the RRC Idle State 720 when the UE transmits frequent small data, the RRC Inactive State 730 may be used. In the RRC Inactive State 730, the AS context may be stored by both UE and gNB. This may result in faster state transition from the RRC Inactive State 730 to RRC Connected State 710. The UE may transition from the RRC Inactive State 730 to the RRC Connected State 710 or from the RRC Connected State 710 to the RRC Inactive State 730 using the RRC Connection Resume/Inactivation procedures 760. The UE may transition from the RRC Inactive State 730 to RRC Idle State 720 using an RRC Connection Release procedure 750.

Figure 8:
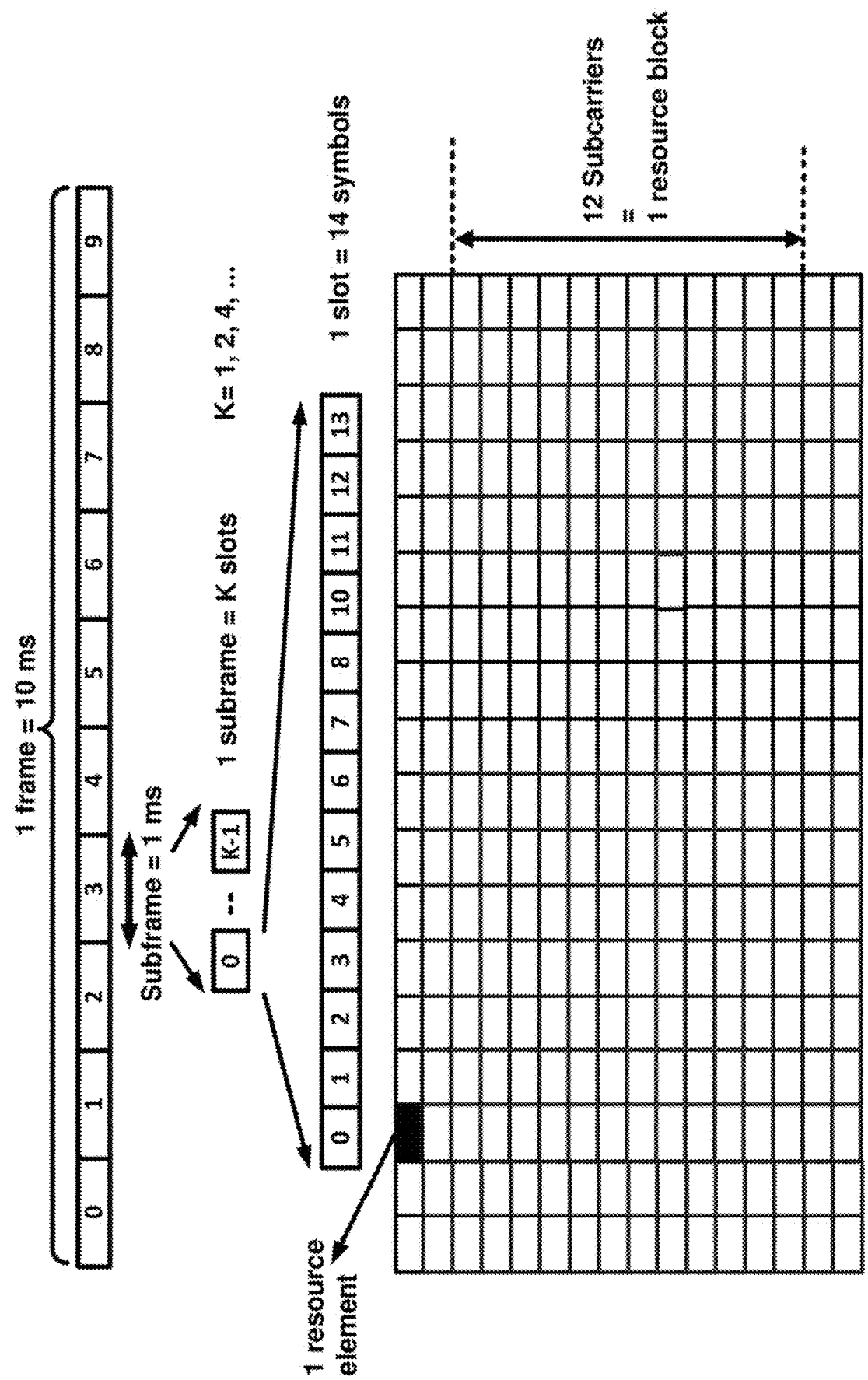
FIG. 8 shows example frame structure and physical resources according to some aspects of some of various exemplary embodiments of the present disclosure.

FIG. 8 shows example frame structure and physical resources according to some aspects of some of various exemplary embodiments of the present disclosure. The downlink or uplink or sidelink transmissions may be organized into frames with 10 ms duration, consisting of ten 1 ms subframes. Each subframe may consist of 1, 2, 4, . . . slots, wherein the number of slots per subframe may depend of the subcarrier spacing of the carrier on which the transmission takes place. The slot duration may be 14 symbols with Normal Cyclic Prefix (CP) and 12 symbols with Extended CP and may scale in time as a function of the used subcarrier spacing so that there is an integer number of slots in a subframe. FIG. 8 shows a resource grid in time and frequency domain. Each element of the resource grid, comprising one symbol in time and one subcarrier in frequency, is referred to as a Resource Element (RE). A Resource Block (RB) may be defined as 12 consecutive subcarriers in the frequency domain.

In some examples and with non-slot-based scheduling, the transmission of a packet may occur over a portion of a slot, for example during 2, 4 or 7 OFDM symbols which may also be referred to as mini-slots. The mini-slots may be used for low latency applications such as URLLC and operation in unlicensed bands. In some embodiments, the mini-slots may also be used for fast flexible scheduling of services (e.g., pre-emption of URLLC over eMBB).

Figure 9:
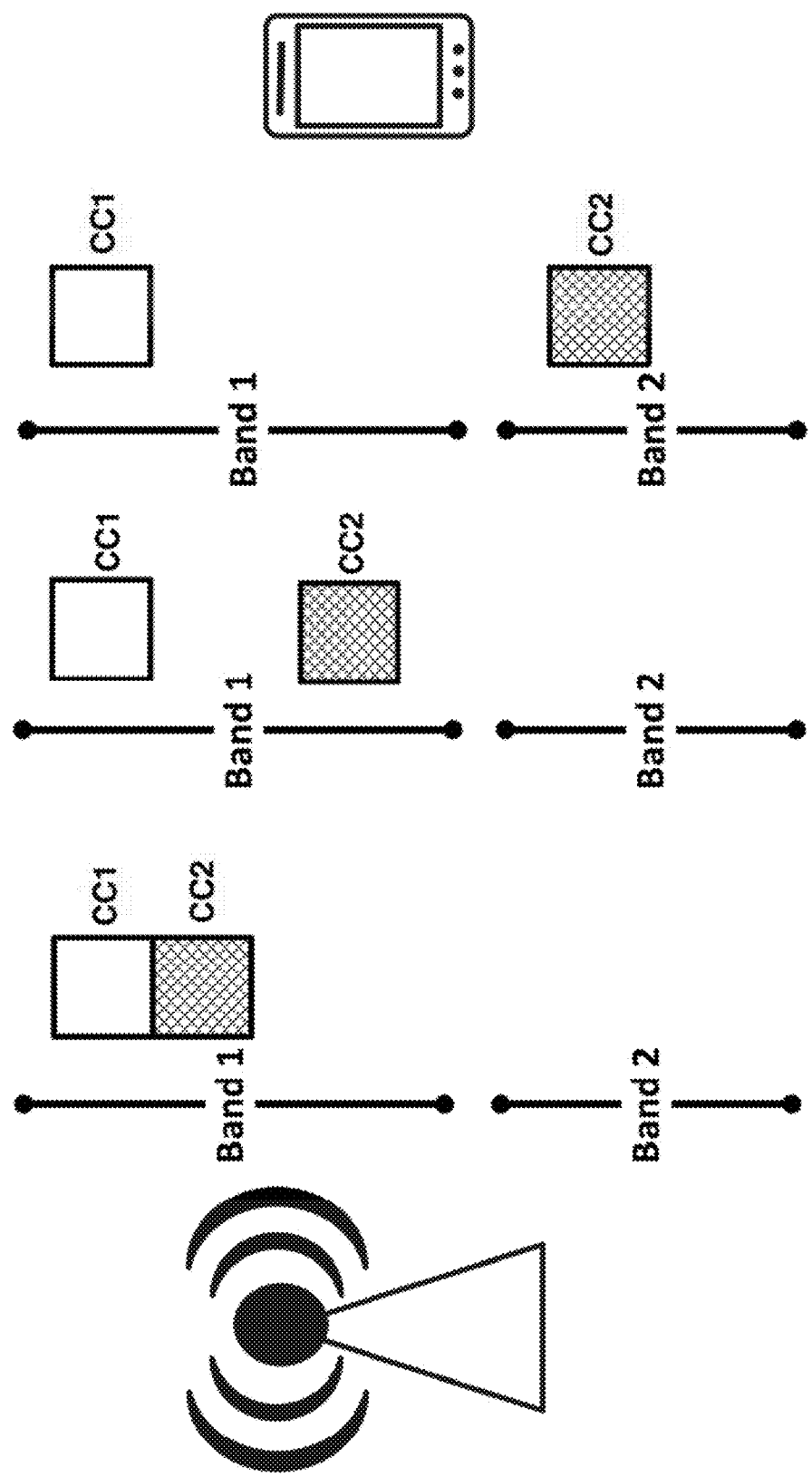
FIG. 9 shows example component carrier configurations in different carrier aggregation scenarios according to some aspects of some of various exemplary embodiments of the present disclosure.

FIG. 9 shows example component carrier configurations in different carrier aggregation scenarios according to some aspects of some of various exemplary embodiments of the present disclosure. In Carrier Aggregation (CA), two or more Component Carriers (CCs) may be aggregated. A UE may simultaneously receive or transmit on one or multiple CCs depending on its capabilities. CA may be supported for both contiguous and non-contiguous CCs in the same band or on different bands as shown in FIG. 9. A gNB and the UE may communicate using a serving cell. A serving cell may be associated at least with one downlink CC (e.g., may be associated only with one downlink CC or may be associated with a downlink CC and an uplink CC). A serving cell may be a Primary Cell (PCell) or a Secondary cCell (SCell).

A UE may adjust the timing of its uplink transmissions using an uplink timing control procedure. A Timing Advance (TA) may be used to adjust the uplink frame timing relative to the downlink frame timing. The gNB may determine the desired Timing Advance setting and provides that to the UE. The UE may use the provided TA to determine its uplink transmit timing relative to the UE's observed downlink receive timing.

In the RRC Connected state, the gNB may be responsible for maintaining the timing advance to keep the L1 synchronized. Serving cells having uplink to which the same timing advance applies and using the same timing reference cell are grouped in a Timing Advance Group (TAG). A TAG may contain at least one serving cell with configured uplink. The mapping of a serving cell to a TAG may be configured by RRC. For the primary TAG, the UE may use the PCell as timing reference cell, except with shared spectrum channel access where an SCell may also be used as timing reference cell in certain cases. In a secondary TAG, the UE may use any of the activated SCells of this TAG as a timing reference cell and may not change it unless necessary.

Timing advance updates may be signaled by the gNB to the UE via MAC CE commands. Such commands may restart a TAG-specific timer which may indicate whether the L1 can be synchronized or not: when the timer is running, the L1 may be considered synchronized, otherwise, the L1 may be considered non-synchronized (in which case uplink transmission may only take place on PRACH).

A UE with single timing advance capability for CA may simultaneously receive and/or transmit on multiple CCs corresponding to multiple serving cells sharing the same timing advance (multiple serving cells grouped in one TAG). A UE with multiple timing advance capability for CA may simultaneously receive and/or transmit on multiple CCs corresponding to multiple serving cells with different timing advances (multiple serving cells grouped in multiple TAGs). The NG-RAN may ensure that each TAG contains at least one serving cell. A non-CA capable UE may receive on a single CC and may transmit on a single CC corresponding to one serving cell only (one serving cell in one TAG).

The multi-carrier nature of the physical layer in case of CA may be exposed to the MAC layer and one HARQ entity may be required per serving cell. When CA is configured, the UE may have one RRC connection with the network. At RRC connection establishment/re-establishment/handover, one serving cell (e.g., the PCell) may provide the NAS mobility information. Depending on UE capabilities, SCells may be configured to form together with the PCell a set of serving cells. The configured set of serving cells for a UE may consist of one PCell and one or more SCells. The reconfiguration, addition and removal of SCells may be performed by RRC.

In a dual connectivity scenario, a UE may be configured with a plurality of cells comprising a Master Cell Group (MCG) for communications with a master base station, a Secondary Cell Group (SCG) for communications with a secondary base station, and two MAC entities: one MAC entity and for the MCG for communications with the master base station and one MAC entity for the SCG for communications with the secondary base station.

Figure 10:
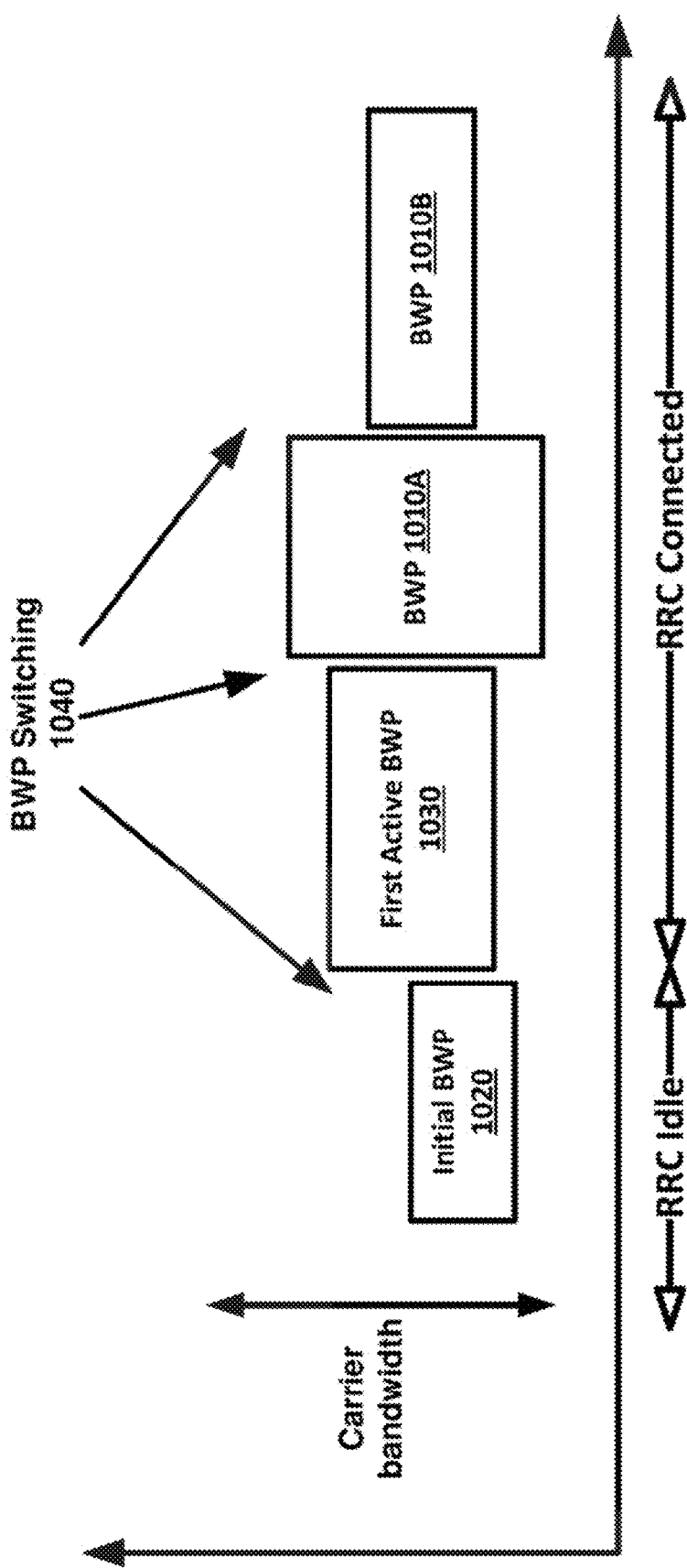
FIG. 10 shows example bandwidth part configuration and switching according to some aspects of some of various exemplary embodiments of the present disclosure.

FIG. 10 shows example bandwidth part configuration and switching according to some aspects of some of various exemplary embodiments of the present disclosure. The UE may be configured with one or more Bandwidth Parts (BWPs) 1010 on a given component carrier. In some examples, one of the one or more bandwidth parts may be active at a time. The active bandwidth part may define the UE's operating bandwidth within the cell's operating bandwidth. For initial access, and until the UE's configuration in a cell is received, initial bandwidth part 1020 determined from system information may be used. With Bandwidth Adaptation (BA), for example through BWP switching 1040, the receive and transmit bandwidth of a UE may not be as large as the bandwidth of the cell and may be adjusted. For example, the width may be ordered to change (e.g. to shrink during period of low activity to save power); the location may move in the frequency domain (e.g. to increase scheduling flexibility); and the subcarrier spacing may be ordered to change (e.g. to allow different services). The first active BWP 1020 may be the active BWP upon RRC (re-)configuration for a PCell or activation of an SCell.

For a downlink BWP or uplink BWP in a set of downlink BWPs or uplink BWPs, respectively, the UE may be provided the following configuration parameters: a Subcarrier Spacing (SCS); a cyclic prefix; a common RB and a number of contiguous RBs; an index in the set of downlink BWPs or uplink BWPs by respective BWP-Id; a set of BWP-common and a set of BWP-dedicated parameters. A BWP may be associated with an OFDM numerology according to the configured subcarrier spacing and cyclic prefix for the BWP. For a serving cell, a UE may be provided by a default downlink BWP among the configured downlink BWPs. If a UE is not provided a default downlink BWP, the default downlink BWP may be the initial downlink BWP.

A downlink BWP may be associated with a BWP inactivity timer. If the BWP inactivity timer associated with the active downlink BWP expires and if the default downlink BWP is configured, the UE may perform BWP switching to the default BWP. If the BWP inactivity timer associated with the active downlink BWP expires and if the default downlink BWP is not configured, the UE may perform BWP switching to the initial downlink BWP.

Figure 11:
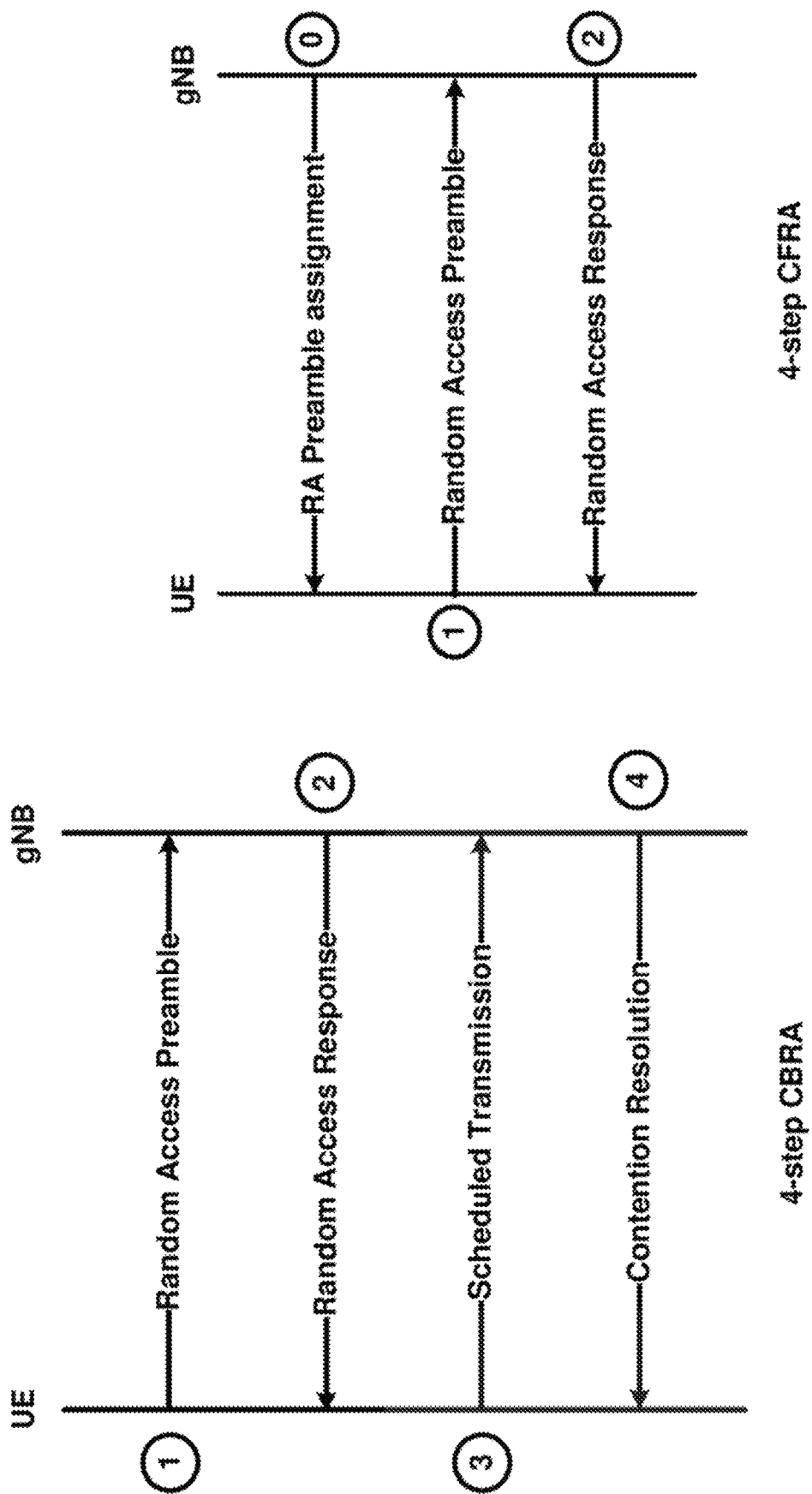
FIG. 11 shows example four-step contention-based and contention-free random access processes according to some aspects of some of various exemplary embodiments of the present disclosure.
Figure 12:
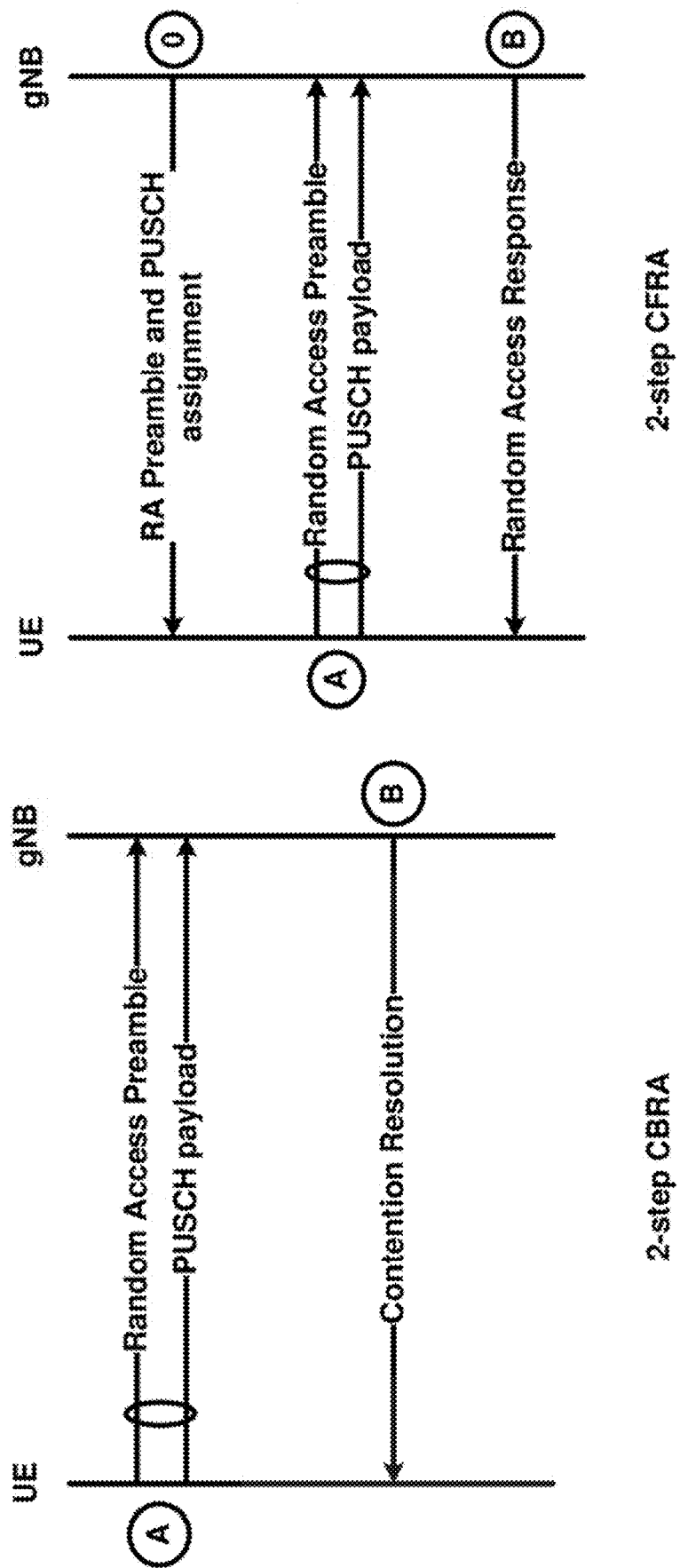
FIG. 12 shows example two-step contention-based and contention-free random access processes according to some aspects of some of various exemplary embodiments of the present disclosure.

FIG. 11 shows example four-step contention-based and contention-free random access processes according to some aspects of some of various exemplary embodiments of the present disclosure. FIG. 12 shows example two-step contention-based and contention-free random access processes according to some aspects of some of various exemplary embodiments of the present disclosure. The random access procedure may be triggered by a number of events, for example: Initial access from RRC Idle State; RRC Connection Re-establishment procedure; downlink or uplink data arrival during RRC Connected State when uplink synchronization status is "non-synchronized"; uplink data arrival during RRC Connected State when there are no PUCCH resources for Scheduling Request (SR) available; SR failure; Request by RRC upon synchronous reconfiguration (e.g. handover); Transition from RRC Inactive State; to establish time alignment for a secondary TAG; Request for Other System Information (SI); Beam Failure Recovery (BFR); Consistent uplink Listen-Before-Talk (LBT) failure on PCell.

Two types of Random Access (RA) procedure may be supported: 4-step RA type with MSG1 and 2-step RA type with MSGA. Both types of RA procedure may support Contention-Based Random Access (CBRA) and Contention-Free Random Access (CFRA) as shown in FIG. 11 and FIG. 12.

The UE may select the type of random access at initiation of the random access procedure based on network configuration. When CFRA resources are not configured, a RSRP threshold may be used by the UE to select between 2-step RA type and 4-step RA type. When CFRA resources for 4-step RA type are configured, UE may perform random access with 4-step RA type. When CFRA resources for 2-step RA type are configured, UE may perform random access with 2-step RA type.

The MSG1 of the 4-step RA type may consist of a preamble on PRACH. After MSG1 transmission, the UE may monitor for a response from the network within a configured window. For CFRA, dedicated preamble for MSG1 transmission may be assigned by the network and upon receiving Random Access Response (RAR) from the network, the UE may end the random access procedure as shown in FIG. 11. For CBRA, upon reception of the random access response, the UE may send MSG3 using the uplink grant scheduled in the random access response and may monitor contention resolution as shown in FIG. 11. If contention resolution is not successful after MSG3 (re)transmission(s), the UE may go back to MSG1 transmission.

The MSGA of the 2-step RA type may include a preamble on PRACH and a payload on PUSCH. After MSGA transmission, the UE may monitor for a response from the network within a configured window. For CFRA, dedicated preamble and PUSCH resource may be configured for MSGA transmission and upon receiving the network response, the UE may end the random access procedure as shown in FIG. 12. For CBRA, if contention resolution is successful upon receiving the network response, the UE may end the random access procedure as shown in FIG. 12; while if fallback indication is received in MSGB, the UE may perform MSG3 transmission using the uplink grant scheduled in the fallback indication and may monitor contention resolution. If contention resolution is not successful after MSG3 (re)transmission(s), the UE may go back to MSGA transmission.

Figure 13:
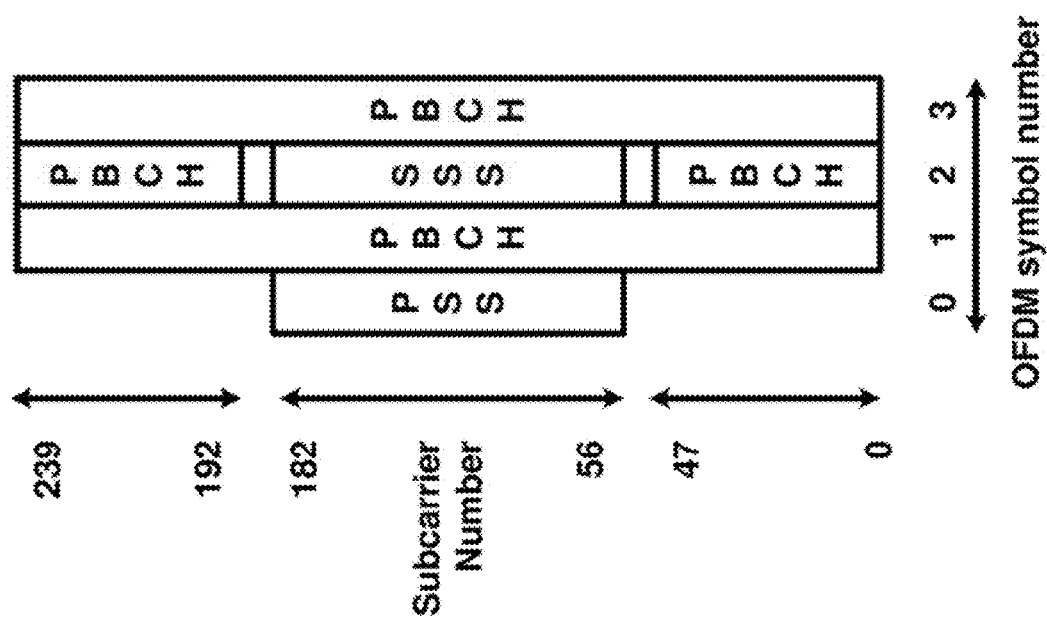
FIG. 13 shows example time and frequency structure of Synchronization Signal and Physical Broadcast Channel (PBCH) Block (SSB) according to some aspects of some of various exemplary embodiments of the present disclosure.

FIG. 13 shows example time and frequency structure of Synchronization Signal and Physical Broadcast Channel (PBCH) Block (SSB) according to some aspects of some of various exemplary embodiments of the present disclosure. The SS/PBCH Block (SSB) may consist of Primary and Secondary Synchronization Signals (PSS, SSS), each occupying 1 symbol and 127 subcarriers (e.g., subcarrier numbers 56 to 182 in FIG. 13), and PBCH spanning across 3 OFDM symbols and 240 subcarriers, but on one symbol leaving an unused part in the middle for SSS as show in FIG. 13. The possible time locations of SSBs within a half-frame may be determined by sub-carrier spacing and the periodicity of the half-frames, where SSBs are transmitted, may be configured by the network. During a half-frame, different SSBs may be transmitted in different spatial directions (i.e. using different beams, spanning the coverage area of a cell).

The PBCH may be used to carry Master Information Block (MIB) used by a UE during cell search and initial access procedures. The UE may first decode PBCH/MIB to receive other system information. The MIB may provide the UE with parameters required to acquire System Information Block 1 (SIB1), more specifically, information required for monitoring of PDCCH for scheduling PDSCH that carries SIB1. In addition, MIB may indicate cell barred status information. The MIB and SIB1 may be collectively referred to as the minimum system information (SI) and SIB1 may be referred to as remaining minimum system information (RMSI). The other system information blocks (SIBS) (e.g., SIB2, SIB3, . . . , SIB10 and SIBpos) may be referred to as Other SI. The Other SI may be periodically broadcast on DL-SCH, broadcast on-demand on DL-SCH (e.g., upon request from UEs in RRC Idle State, RRC Inactive State, or RRC connected State), or sent in a dedicated manner on DL-SCH to UEs in RRC Connected State (e.g., upon request, if configured by the network, from UEs in RRC Connected State or when the UE has an active BWP with no common search space configured).

Figure 14:
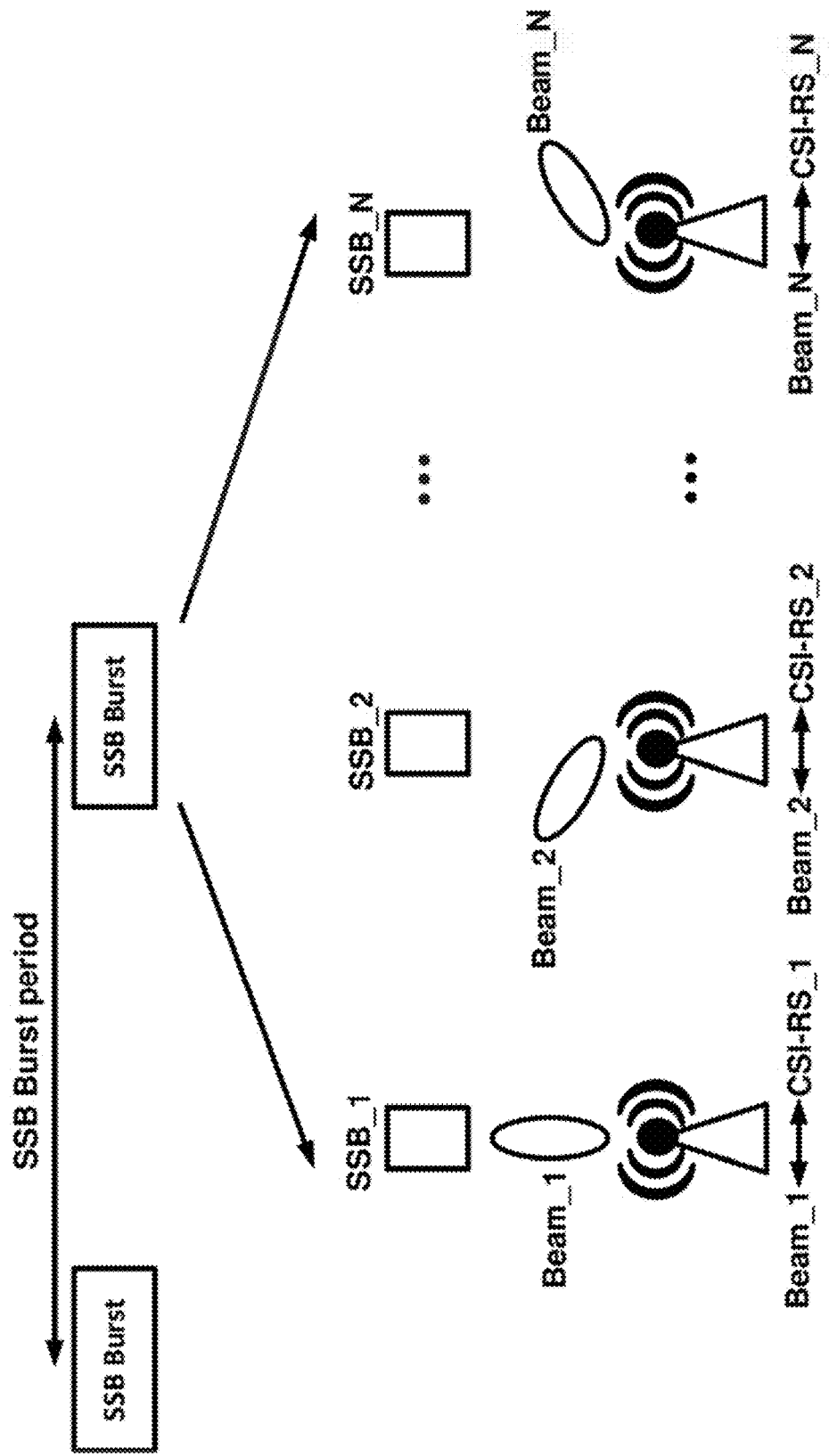
FIG. 14 shows example SSB burst transmissions according to some aspects of some of various exemplary embodiments of the present disclosure.

FIG. 14 shows example SSB burst transmissions according to some aspects of some of various exemplary embodiments of the present disclosure. An SSB burst may include N SSBs and each SSB of the N SSBs may correspond to a beam. The SSB bursts may be transmitted according to a periodicity (e.g., SSB burst period). During a contention-based random access process, a UE may perform a random access resource selection process, wherein the UE first selects an SSB before selecting a RA preamble. The UE may select an SSB with an RSRP above a configured threshold value. In some embodiments, the UE may select any SSB if no SSB with RSRP above the configured threshold is available. A set of random access preambles may be associated with an SSB. After selecting an SSB, the UE may select a random access preamble from the set of random access preambles associated with the SSB and may transmit the selected random access preamble to start the random access process.

In some embodiments, a beam of the N beams may be associated with a CSI-RS resource. A UE may measure CSI-RS resources and may select a CSI-RS with RSRP above a configured threshold value. The UE may select a random access preamble corresponding to the selected CSI-RS and may transmit the selected random access process to start the random access process. If there is no random access preamble associated with the selected CSI-RS, the UE may select a random access preamble corresponding to an SSB which is Quasi-Collocated with the selected CSI-RS.

In some embodiments, based on the UE measurements of the CSI-RS resources and the UE CSI reporting, the base station may determine a Transmission Configuration Indication (TCI) state and may indicate the TCI state to the UE, wherein the UE may use the indicated TCI state for reception of downlink control information (e.g., via PDCCH) or data (e.g., via PDSCH). The UE may use the indicated TCI state for using the appropriate beam for reception of data or control information. The indication of the TCI states may be using RRC configuration or in combination of RRC signaling and dynamic signaling (e.g., via a MAC Control element (MAC CE) and/or based on a value of field in the downlink control information that schedules the downlink transmission). The TCI state may indicate a Quasi-Colocation (QCL) relationship between a downlink reference signal such as CSI-RS and the DM-RS associated with the downlink control or data channels (e.g., PDCCH or PDSCH, respectively).

In some embodiments, the UE may be configured with a list of up to M TCI-State configurations, using Physical Downlink Shared Channel (PDSCH) configuration parameters, to decode PDSCH according to a detected PDCCH with DCI intended for the UE and the given serving cell, where M may depends on the UE capability. Each TCI-State may contain parameters for configuring a QCL relationship between one or two downlink reference signals and the DM-RS ports of the PDSCH, the DM-RS port of PDCCH or the CSI-RS port(s) of a CSI-RS resource. The quasi co-location relationship may be configured by one or more RRC parameters. The quasi co-location types corresponding to each DL RS may take one of the following values: 'QCL-TypeA': {Doppler shift, Doppler spread, average delay, delay spread}; 'QCL-TypeB': {Doppler shift, Doppler spread}; 'QCL-TypeC': {Doppler shift, average delay}; 'QCL-TypeD': {Spatial Rx parameter}. The UE may receive an activation command (e.g., a MAC CE), used to map TCI states to the codepoints of a DCI field.

Figure 15:
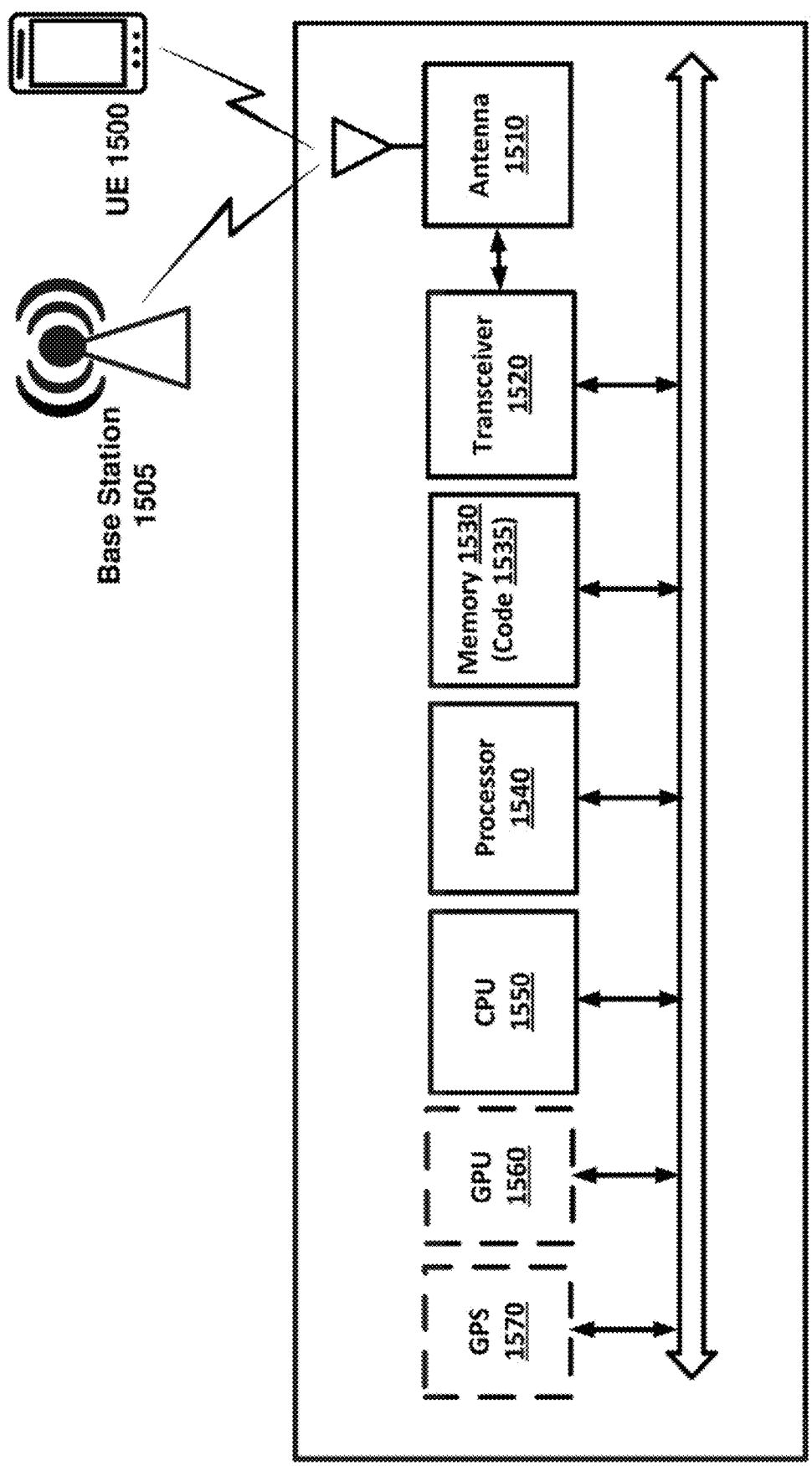
FIG. 15 shows example components of a user equipment and a base station for transmission and/or reception according to some aspects of some of various exemplary embodiments of the present disclosure.

FIG. 15 shows example components of a user equipment and a base station for transmission and/or reception according to some aspects of some of various exemplary embodiments of the present disclosure. In one embodiment, the illustrative components of FIG. 15 may be considered to be illustrative of functional blocks of an illustrative base station 1505. In another embodiment, the illustrative components of FIG. 15 may be considered to be illustrative of functional blocks of an illustrative user equipment 1500. Accordingly, the components illustrated in FIG. 15 are not necessarily limited to either a user equipment or base station.

With reference to FIG. 15, the Antenna 1510 may be used for transmission or reception of electromagnetic signals. The Antenna 1510 may comprise one or more antenna elements and may enable different input-output antenna configurations including Multiple-Input Multiple Output (MIMO) configuration, Multiple-Input Single-Output (MISO) configuration and Single-Input Multiple-Output (SIMO) configuration. In some embodiments, the Antenna 150 may enable a massive MIMO configuration with tens or hundreds of antenna elements. The Antenna 1510 may enable other multi-antenna techniques such as beamforming. In some embodiments and depending on the UE 1500 capabilities or the type of UE 1500 (e.g., a low-complexity UE), the UE 1500 may support a single antenna only.

The transceiver 1520 may communicate bi-directionally, via the Antenna 1510, wireless links as described herein. For example, the transceiver 1520 may represent a wireless transceiver at the UE and may communicate bi-directionally with the wireless transceiver at the base station or vice versa. The transceiver 1520 may include a modem to modulate the packets and provide the modulated packets to the Antennas 1510 for transmission, and to demodulate packets received from the Antennas 1510.

The memory 1530 may include RAM and ROM. The memory 1530 may store computer-readable, computer-executable code 1535 including instructions that, when executed, cause the processor to perform various functions described herein. In some examples, the memory 1530 may contain, among other things, a Basic Input/output System (BIOS) which may control basic hardware or software operation such as the interaction with peripheral components or devices.

The processor 1540 may include a hardware device with processing capability (e.g., a general purpose processor, a DSP, a CPU, a microcontroller, an ASIC, an FPGA, a programmable logic device, a discrete gate or transistor logic component, a discrete hardware component, or any combination thereof). In some examples, the processor 1540 may be configured to operate a memory using a memory controller. In other examples, a memory controller may be integrated into the processor 1540. The processor 1540 may be configured to execute computer-readable instructions stored in a memory (e.g., the memory 1530) to cause the UE 1500 or the base station 1505 to perform various functions.

The Central Processing Unit (CPU) 1550 may perform basic arithmetic, logic, controlling, and Input/output (I/O) operations specified by the computer instructions in the Memory 1530. The user equipment 1500 and/or the base station 1505 may include additional peripheral components such as a graphics processing unit (GPU) 1560 and a Global Positioning System (GPS) 1570. The GPU 1560 is a specialized circuitry for rapid manipulation and altering of the Memory 1530 for accelerating the processing performance of the user equipment 1500 and/or the base station 1505. The GPS 1570 may be used for enabling location-based services or other services for example based on geographical position of the user equipment 1500.

In some example, MBS services may be enabled via single-cell transmission. MBS may be transmitted in the coverage of a single cell. One or more Multicast/Broadcast control channels (e.g., MCCHs) and one or more Multicast/Broadcast data channels (e.g., MTCHs) may be mapped on DL-SCH. The scheduling may be done by the gNB. The Multicast/Broadcast control channel and the Multicast/Broadcast data channel transmissions may be indicated by a logical channel specific RNTI on PDCCH. In some examples, a one-to-one mapping between a service identifier such as a temporary mobile group identifier (TMGI) and a RAN level identifier such as a group identifier (G-RNTI) may be used for the reception of the DL-SCH to which a Multicast/Broadcast data channel may be mapped. In some examples, a single transmission may be used for DL-SCH associated with the Multicast/Broadcast control channel and/or the Multicast/Broadcast data channel transmissions and HARQ or RLC retransmissions may not be used and/or an RLC Unacknowledged Mode (RLC UM) may be used. In other examples some feedback (e.g., HARQ feedback or RLC feedback) may be used for transmissions via Multicast/Broadcast control channel and/or Multicast/Broadcast data channels.

In some example, for Multicast/Broadcast data channel, the following scheduling information may be provided on Multicast/Broadcast control channel: a Multicast/Broadcast data channel scheduling cycle, a Multicast/Broadcast data channel on-duration (e.g., duration that the UE waits for, after waking up from DRX, to receive PDCCHs), a Multicast/Broadcast data channel inactivity timer (e.g., duration that the UE waits to successfully decode a PDCCH, from the last successful decoding of a PDCCH indicating the DL-SCH to which this Multicast/Broadcast data channel is mapped, failing which it re-enters DRX).

In some examples, one or more UE identities may be related to MBS transmissions. The one or more identities may comprise at least one of: one or more first RNTIs that identify transmissions of the Multicast/Broadcast control channel; one or more second RNTIs that identify transmissions of a Multicast/Broadcast data channels. The one or more first RNTIs that identify transmissions of the Multicast/Broadcast control channel may comprise a single cell RNTI (SC-RNTI, other names may be used). The one or more second RNTIs that identify transmissions of a Multicast/Broadcast data channels may comprise a G-RNTI (nG-RNTI or other names may be used).

In some examples, one or more logical channels may be related to MBS transmissions. The one or more logical channels may comprise a Multicast/Broadcast control channel. The Multicast/Broadcast control channel may be a point-to-multipoint downlink channel used for transmitting MBS control information from the network to the UE, for one or several Multicast/Broadcast data channel. This channel may be used by UEs that receive or are interested to receive MBS. The one or more logical channels may comprise a Multicast/Broadcast data channel. This channel may be a point-to-multipoint downlink channel for transmitting MBS traffic data from the network.

Figure 16:
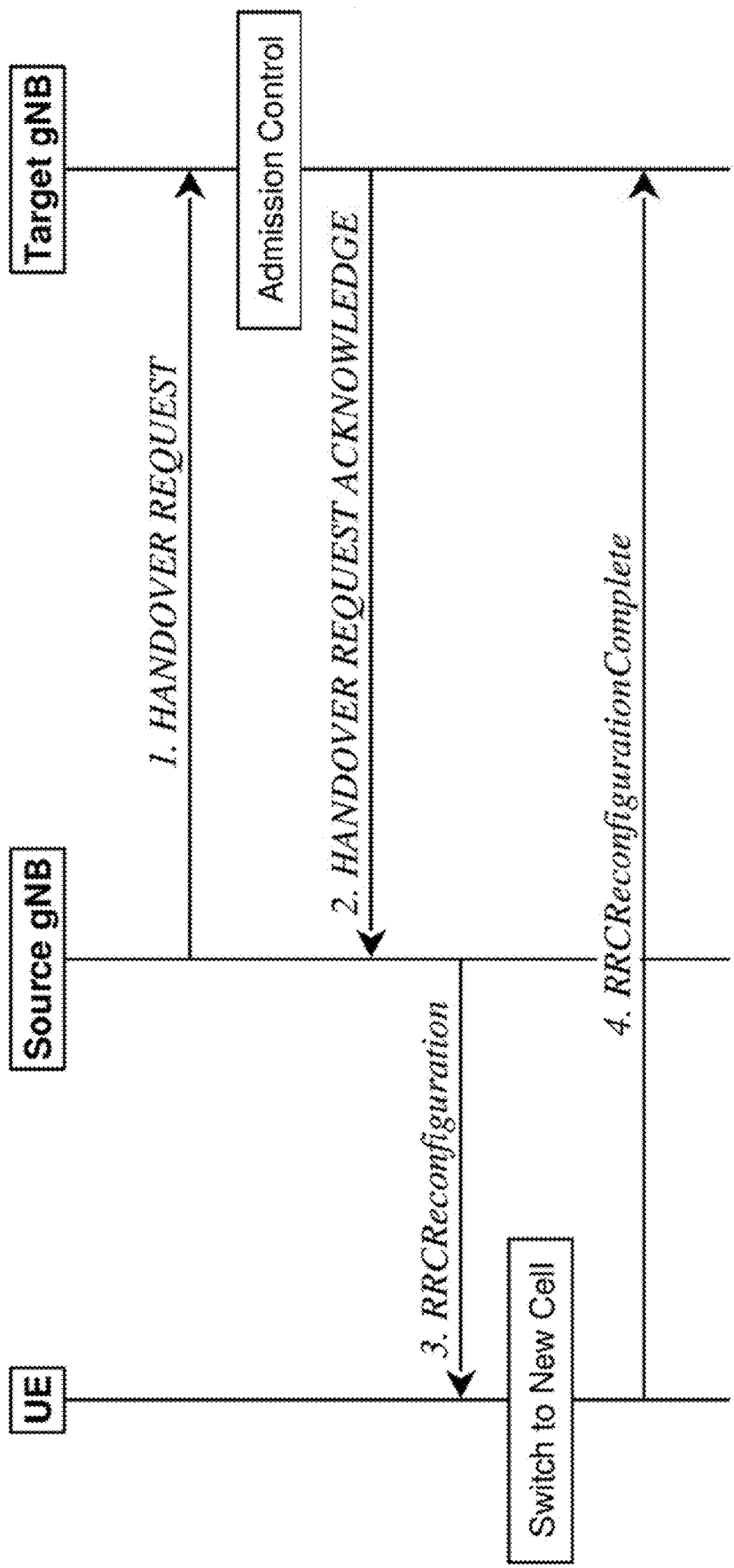
FIG. 16 shows an example handover process according to some aspects of some of various exemplary embodiments of the present disclosure.

In some examples, a procedure may be used by the UE to inform RAN that the UE is receiving or is interested to receive MBS service(s) via an MBS radio bearer, and if so, to inform the 5G RAN about the priority of MBS versus unicast reception or MBS service(s) reception in receive only mode. An example is shown in FIG. 16. The UE may transmit a message (e.g., an MBS interest indication message) message to inform RAN that the UE is receiving/interested to receive or no longer receiving/interested to receive MBS service(s). The UE may transmit the message based on receiving one or more messages (e.g., a SIB message or a unicast RRC message) from the network for example indicating one or more MBS Service Area Identifiers of the current and/or neighboring carrier frequencies.

In some examples, the UE may consider an MBS service to be part of the MBS services of interest if the UE is capable of receiving MBS services (e.g., via a single cell point to multipoint mechanism); and/or the UE is receiving or interested to receive this service via a bearer associated with MBS services; and/or one session of this service is ongoing or about to start; and/or at least one of the one or more MBS service identifiers indicated by network is of interest to the UE.

In some examples, control information for reception of MBS services may be provided on a specific logical channel: (e.g., a MCCH). The MCCH may carry one or more configuration messages which indicate the MBS sessions that are ongoing as well as the (corresponding) information on when each session may be scheduled, e.g., scheduling period, scheduling window and start offset. The one or more configuration messages may provide information about the neighbor cells transmitting the MBS sessions which may be ongoing on the current cell. In some examples, the UE may receive a single MBS service at a time, or more than one MBS services in parallel.

In some example, the MCCH information (e.g., the information transmitted in messages sent over the MCCH) may be transmitted periodically, using a configurable repetition period. The MCCH transmissions (and the associated radio resources and MCS) may be indicated on PDCCH.

In some examples, change of MCCH information may occur at specific radio frames/subframes/slots and/or a modification period may be used. For example, within a modification period, the same MCCH information may be transmitted a number of times, as defined by its scheduling (which is based on a repetition period). The modification period boundaries may be defined by SFN values for which SFN mod m=0, where m is the number of radio frames comprising the modification period. The modification period may be configured by a SIB or by RRC signaling.

In some examples, when the network changes (some of) the MCCH information, it may notify the UEs about the change in the first subframe/slot which may be used for MCCH transmission in a repetition period. Upon receiving a change notification, a UE interested to receive MBS services may acquire the new MCCH information starting from the same subframe/slot. The UE may apply the previously acquired MCCH information until the UE acquires the new MCCH information.

In an example, a system information block (SIB) may contain the information required to acquire the control information associated transmission of MBS. The information may comprise at least one of: one or more discontinuous reception (DRX) parameters for monitoring for scheduling information of the control information associated transmission of MBS, scheduling periodicity and offset for scheduling information of the control information associated transmission of MBS, modification period for modification of content of the control information associated transmission of MBS, repetition information for repetition of the control information associated transmission of MBS, etc.

In an example, an information element (IE) may provide configuration parameters indicating, for example, the list of ongoing MBS sessions transmitted via one or more bearers for each MBS session, one or more associated RNTIs (e.g., G-RNTI, other names may be used) and scheduling information. The configuration parameters may comprise at least one of: one or more timer values for discontinuous reception (DRX) (e.g., an inactivity timer or an On Duration timer), an RNTI for scrambling the scheduling and transmission of a Multicast/Broadcast traffic channel (e.g., MTCH, other names may be used), ongoing MBS session, one or more power control parameters, one or more scheduling periodicity and/or offset values for one or more MBS traffic channels, information about list of neighbor cells, etc.

Example embodiments may enable RAN functions for broadcast/multicast for UEs in RRC_CONNECTED state, RRC_IDLE state and RRC_INACTIVE state. A group scheduling mechanism may be used to allow UEs to receive Broadcast/Multicast service. In some example, Broadcast/Multicast service may be enabled to simultaneously operate with unicast reception. In some example, Broadcast/Multicast service delivery may be dynamically changed between multicast (PTM) and unicast (PTP) with service continuity for a given UE. In some examples, a coordination function may reside in the gNB-CU. In some examples, reliability of Broadcast/Multicast service may be improved by UL feedback. The level of reliability may be based on the requirements of the application/service provided. In some examples, the Broadcast/Multicast transmission area may be dynamically controlled within one gNB-DU.

In some examples, a network controlled mobility may apply to UEs in RRC_CONNECTED and may be categorized into two types of mobility: cell level mobility and beam level mobility. The cell Level Mobility may require explicit RRC signaling to be triggered. An example cell level mobility signaling for cell-level mobility is shown in FIG. 16 and may comprise following components: the source gNB may initiate handover and issues a HANDOVER REQUEST over the Xn interface; the target gNB may perform admission control and may provide the new RRC configuration as part of the HANDOVER REQUEST ACKNOWLEDGE; the source gNB may provide the RRC configuration to the UE by forwarding the RRCReconfiguration message received in the HANDOVER REQUEST ACKNOWLEDGE. The RRCReconfiguration message may include at least cell ID and information required to access the target cell so that the UE can access the target cell without reading system information. For some cases, the information required for contention-based and contention-free random access may be included in the RRCReconfiguration message. The access information to the target cell may include beam specific information; the UE may move the RRC connection to the target gNB and may reply with the RRCReconfigurationComplete.

In some examples and in case of dual access protocol stack (DAPS) handover, the UE may continue the downlink user data reception from the source gNB until releasing the source cell and may continue the uplink user data transmission to the source gNB until successful random access procedure to the target gNB.

In some examples, the handover mechanism triggered by RRC may require the UE at least to reset the MAC entity and re-establish RLC, except for DAPS handover, where upon reception of the handover command, the UE may: create a MAC entity for target; establishes the RLC entity and an associated DTCH logical channel for target for each DRB configured with DAPS; for the DRB configured with DAPS, reconfigures the PDCP entity with separate security and ROHC functions for source and target and associate them with the RLC entities configured by source and target respectively; retain the rest of the source configurations until release of the source.

In some examples, RRC managed handover with and without PDCP entity re-establishment may be supported. For DRBs using RLC acknowledgement mode (AM) mode, PDCP may either be re-established together with a security key change or initiate a data recovery procedure without a key change. For DRBs using RLC unacknowledged mode (UM) mode and for SRBs, PDCP may either be re-established together with a security key change or remain as it is without a key change.

In some examples, data forwarding, in-sequence delivery and duplication avoidance at handover may be guaranteed when the target gNB uses the same DRB configuration as the source gNB.

In some examples, a timer-based handover failure procedure may be supported. An RRC connection re-establishment procedure may be used for recovering from handover failure.

In some examples, beam level mobility may not require explicit RRC signaling to be triggered. The gNB may provide, via RRC signaling, the UE with measurement configuration containing configurations of SSB/CSI resources and resource sets, reports and trigger states for triggering channel and interference measurements and reports. The beam level mobility may be dealt with at lower layers by means of physical layer and MAC layer control signalling, and RRC may not be required to know which beam is being used at a given point in time.

In some examples, SSB-based beam level mobility may be based on the SSB associated to the initial DL BWP and may be configured for the initial DL BWPs and for DL BWPs containing the SSB associated to the initial DL BWP. For other DL BWPs, beam level mobility may be performed based on CSI-RS.

In some examples, the radio resource management (RRM) configuration may include both beam measurement information (for layer 3 mobility) associated to SSB(s) and CSI-RS(s) for the reported cell(s) if both types of measurements are available. In some examples, if carrier aggregation is configured, the RRM configuration may include the list of best cells on each frequency for which measurement information is available. The RRM measurement information may include the beam measurement for the listed cells that belong to the target gNB.

In some examples, the user plane handling during the Intra-NR-Access mobility activity for UEs in RRC_CONNECTED may take the following principles into account to avoid data loss during HO: during HO preparation, user plane tunnels may be established between the source gNB and the target gNB; during HO execution, user data may be forwarded from the source gNB to the target gNB; forwarding may take place in order as long as packets are received at the source gNB from the UPF or the source gNB buffer has not been emptied.

In some examples, during HO completion: the target gNB may send a path switch request message to the AMF to inform that the UE has gained access and the AMF then may trigger path switch related 5GC internal signalling and actual path switch of the source gNB to the target gNB in UPF; the source gNB may continue forwarding data as long as packets are received at the source gNB from the UPF or the source gNB buffer has not been emptied.

In some examples, a Conditional Handover (CHO) may be used which is a handover that is executed by the UE when one or more handover execution conditions are met. The UE may start evaluating the execution condition(s) upon receiving the CHO configuration, and may stop evaluating the execution condition(s) once a handover is executed (e.g., legacy handover or conditional handover execution).

In some examples, the following principles may apply to CHO: the CHO configuration may contain the configuration of CHO candidate cell(s) generated by the candidate gNB(s) and execution condition(s) generated by the source gNB; an execution condition may consist of one or two trigger condition(s); Before a CHO execution condition is satisfied, upon reception of HO command (without CHO configuration), the UE may execute the HO procedure, regardless of any previously received CHO configuration; while executing CHO, i.e. from the time when the UE starts synchronization with target cell, UE may not monitor source cell.

In some examples, in RRC_CONNECTED, the UE may measure multiple beams (at least one) of a cell and the measurements results (power values) may be averaged to derive the cell quality. In doing so, the UE may be configured to consider a subset of the detected beams. Filtering may take place at two different levels: at the physical layer to derive beam quality and then at RRC level to derive cell quality from multiple beams. Cell quality from beam measurements may be derived in the same way for the serving cell(s) and for the non-serving cell(s). Measurement reports may contain the measurement results of the X best beams if the UE is configured to do so by the gNB.

In some examples, an RRCReconfiguration message may be the command to modify an RRC connection. It may convey information for measurement configuration, mobility control, radio resource configuration (including RBs, MAC main configuration and physical channel configuration) and AS security configuration.

In some examples, an RRCReconfigurationComplete message may be used to confirm the successful completion of an RRC connection reconfiguration.

In some examples, an information element (IE) MeasConfig may specify measurements to be performed by the UE, and covers intra-frequency, inter-frequency and inter-RAT mobility as well as configuration of measurement gaps.

In some examples, an IE MeasId may be used to identify a measurement configuration, e.g., linking of a measurement object and a reporting configuration.

In some examples, an IE MeasIdToAddModList may concern a list of measurement identities to add or modify, with for each entry the measId, the associated measObjectId and the associated reportConfigId.

In some examples, an IE MeasObjectNR may specify information applicable for SS/PBCH block(s) intra/inter-frequency measurements and/or CSI-RS intra/inter-frequency measurements.

In some examples a gNB or ng-eNB may comprise logical nodes that host some, all or parts of the user plane and/or control plane functionalities. For example, a gNB Central Unit (gNB-CU) may be a logical node hosting RRC, SDAP and PDCP protocols of the gNB or RRC and PDCP protocols of the en-gNB that controls the operation of one or more gNB-DUs. The gNB-CU may terminate the F1 interface connected with the gNB-DU. A gNB Distributed Unit (gNB-DU) may be a logical node hosting RLC, MAC and PHY layers of the gNB or en-gNB, and its operation may be partly controlled by gNB-CU. One gNB-DU may support one or multiple cells. One cell may be supported by only one gNB-DU. The gNB-DU may terminate the F1 interface connected with the gNB-CU. A gNB-CU-Control Plane (gNB-CU-CP) may be a logical node hosting the RRC and the control plane part of the PDCP protocol of the gNB-CU for an en-gNB or a gNB. The gNB-CU-CP may terminate the E1 interface connected with the gNB-CU-UP and the F1-C interface connected with the gNB-DU. A gNB-CU-User Plane (gNB-CU-UP) may be a logical node hosting the user plane part of the PDCP protocol of the gNB-CU for an en-gNB, and the user plane part of the PDCP protocol and the SDAP protocol of the gNB-CU for a gNB. The gNB-CU-UP may terminate the E1 interface connected with the gNB-CU-CP and the F1-U interface connected with the gNB-DU.

In some examples, Multicast service may be delivered to RRC_CONNECTED state UEs either by using MRB or DRB as gNB implementation choice. In order to support loss-less handover for Multicast service(s), following are possible handover scenarios: MRB to MRB; MRB to DRB; DRB to MRB and DRB to DRB (this is same as unicast DRB handover).

Figure 17A:
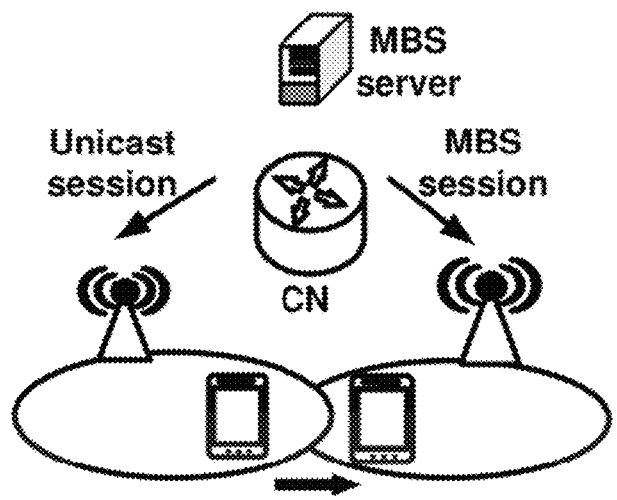
FIG. 17A, FIG. 17B and FIG. 17C show example multicast broadcast services/sessions service continuity scenarios according to some aspects of some of various exemplary embodiments of the present disclosure.
Figure 17B:
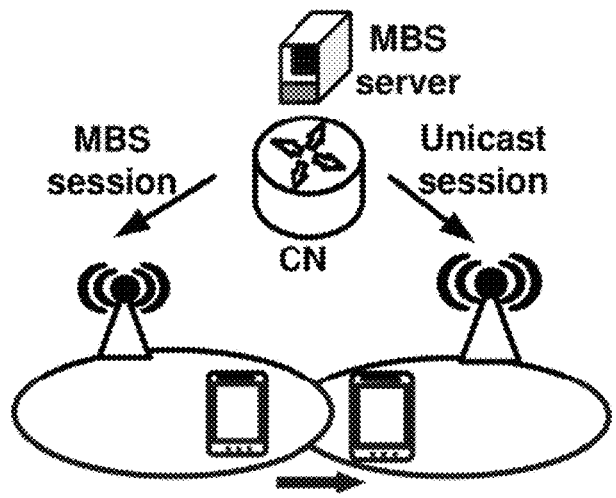
Figure 17C:
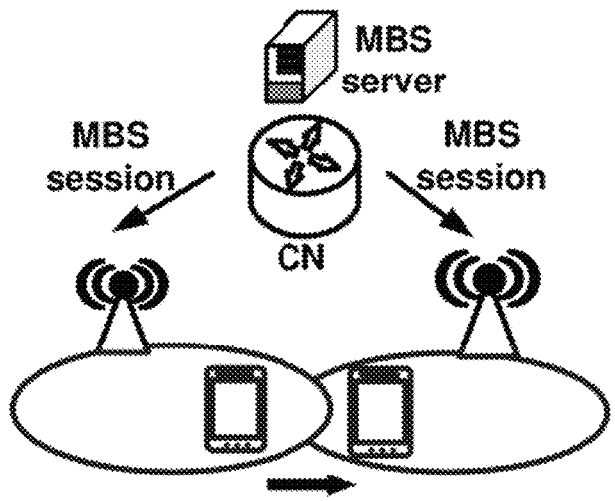

Example scenarios where the MBS services/sessions may be handed over from a Unicast session to an MBS session, from an MBS session to a Unicast session or from an MBS session to an MBS session are shown in FIG. 17A, FIG. 17B and FIG. 17C, respectively. In some examples, the source gNB may use MBS session and the target gNB may use unicast PDU session for MBS service delivery. The target gNB may not support MBS session and the MBS session may not be established in the target gNB. The MBS Session established in the source gNB may be converted to the unicast PDU session during handover and the traditional handover mechanism may be reused for the MBS UE mobility. In some examples, a unicast PDU session may be established and linked to the MBS session even when there is no unicast service at the UE.

In some examples, the source gNB may use unicast PDU session and the target gNB may use MBS session for MBS service delivery. In this scenario, if MBS session is not being used in the source gNB, the MBS service may be delivered via unicast PDU Session. In this case, one way of implementation is that the traditional handover mechanism may be applied for UE mobility to the target gNB based on the unicast PDU session. After the complete of handover, the unicast PDU session may be converted to the MBS session in the target gNB. In some examples, the switch from unicast PDU session to the MBS session may be done during handover, i.e. the target gNB may immediately establish the MBS session when accepting the UE handed over to the target.

In some examples, both the source gNB and the target gNB may use MBS session for MBS service delivery. For this scenario, the MBS session may be used in the source gNB and may be used in the target gNB. This scenario may further include two cases: the MBS session is ongoing or not ongoing in the target gNB. For both cases, the MBS UE may continue receiving the MBS service via MBS session and the corresponding MBS bearer in the target gNB after handover.

In some examples, the MBS service ID may be indicated to the target gNB during handover, and the MBS configuration of the target gNB may be sent to UE in a handover command.

In some examples, the PDCP sequence numbers for the same MBS packet should be aligned in different gNBs.

In some examples, for mobility support, the UE may need PTM configuration at new serving node and new serving node needs UE MBS context. In some examples, for intra-gNB mobility in RRC_CONNECTED, the same PTM configuration may be used in gNB-DUs and there may be no need for UE MBS context handling. In some examples, PTM configuration may be provided to UE with information of an area where the PTM configuration is applicable.

In some examples, the HANDOVER REQUEST sent by the source gNB to the target gNB during the handover preparation phase may include UE MBS context of the UE. The HANDOVER REQUEST ACKNOWLEDGE message sent by the target gNB to source gNB may include configuration information of the MBS session(s). This configuration may be included in the RRCReconfiguration message sent by the source gNB to the UE. After synchronizing with the target gNB, the UE may use this configuration to configure radio bearer for reception of MBS service(s) at the target gNB.

In some examples, Multicast and Broadcast Service (MBS) may use a Single Cell Single Cell Point-to-Multipoint (SC-PTM) framework. The SC-PTM may be used for eMBMS services, Mission Critical Push-to-Talk (MCPTT), Internet of Things (IoT), and also Vehicle-to-everything (V2X).

In some examples, the MBS services may have different QoS, mobility, service continuity and reliability requirements. Example embodiments enable service continuity and mobility support to ensure UE's can receive the MBS service without any loss of data as they move from one cell or carrier to another.

In some examples, the domain of applicability of an MBS configuration and service continuity may be at a base station-level or a distributed unit (DU)-level or beam-level. In some examples, the MBS decisions on unicasting or multicasting may be at DU level or the decision on transmitting MBS data as unicast or multicast may be made more finely at Radio Units/remote radio head (RRH) or at beam level.

In some example, MBS RAN level parameters for an MBS service and/or UE may be configured at RRC, e.g., at the central unit (CU) of a RAN node, and may be configuration differently for different DUs.

In some examples, different MBS transmission decision and configurations may be across DUs associated with the same gNB. In some examples, the MBS control and data transmission configurations are the same across all DUs associated with the same gNB. The MBS service continuity across DUs may be supported. In some examples, the MBS control and data transmission configurations may not be the same across all DUs associated with the same gNB. The MBS service continuity across DUs may be based on intra-gNB and/or beam level measurement and signaling with the gNB.

In some examples, the MBS transmission may be configured at DU level and the mobility/handover between cells may be based on inter-gNB mobility/handover. In some examples, the MBS transmissions may be configured differently at different remote radios (RU)/remote radio heads (RRHs) or beams. In some examples, the measurement and/or the mobility triggers may be adjusted to detect the mobility between RRH/Beams and lower layer MAC signaling may be used to be processed by DU.

In some examples, for UEs in connected mode receiving MBS in the source cell, the handover (HO) process to the target cell may be based on the unicast HO process. In some example, the HO process for an MBS session may be enhanced compared to the HO process for a unicast session. One or more of the following scenarios may be supported where parameters associated with an MBS radio bearer (MRB) or data radio bearer (DRB) in target cell may be provided to the UE as part of HO direction: MRB to MRB; MRB to DRB; and DRB to MRB.

In some examples, MBS services delivered in multicast through MBS traffic channel (e.g., MTCH) may use a different set of antenna ports than those used for unicast traffic. In some examples, the 5G RAN may configure a set of reference signals, e.g. SSB or CSI-RS resources, to be used for MBS related measurement. The set of reference signals, e.g. SSB or CSI-RS resources, for the unicast services may be different from the set of reference signals for the MBS services.

Figure 18:
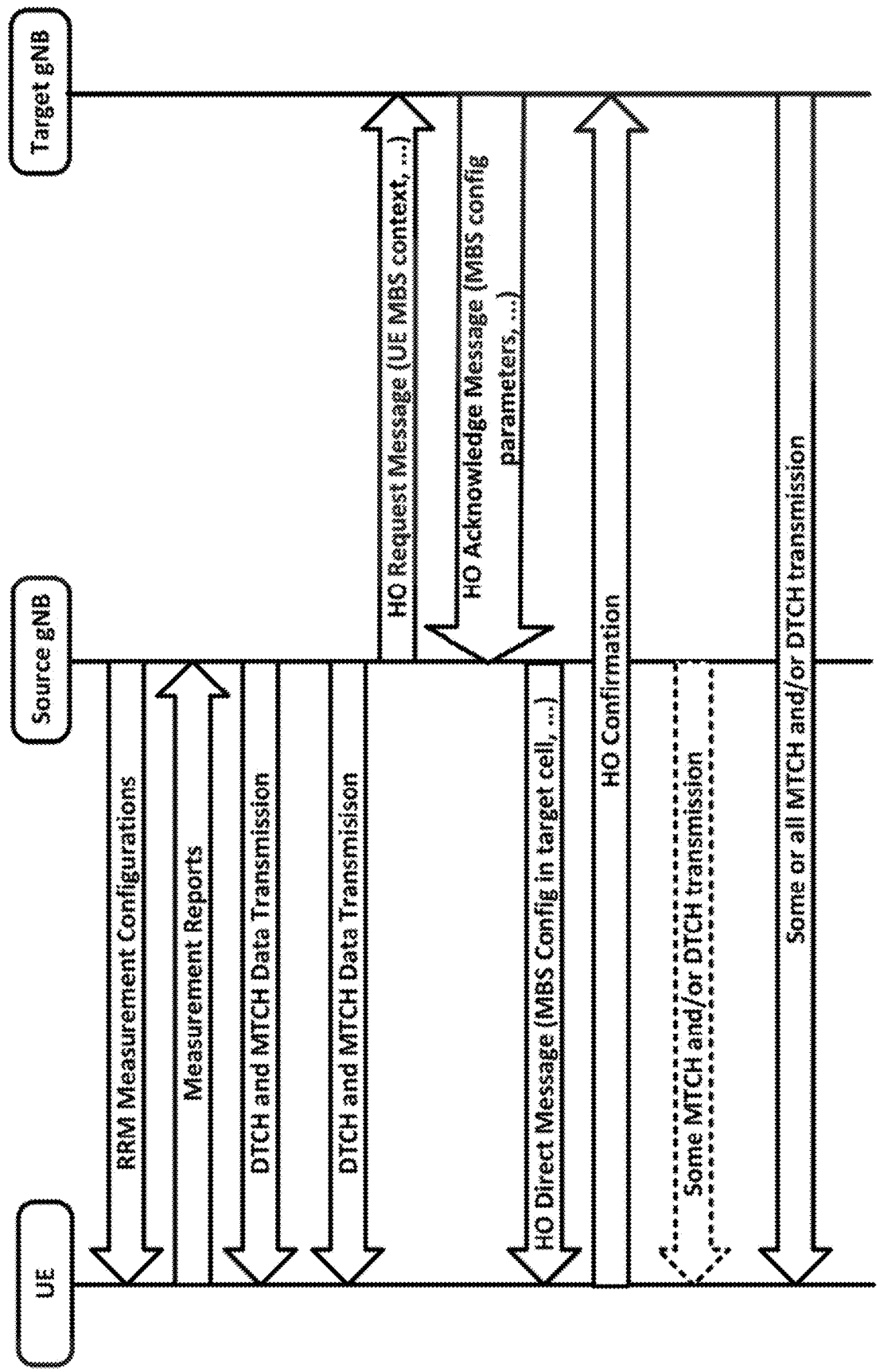
FIG. 18 shows an example process according to some aspects of some of various exemplary embodiments of the present disclosure.

An example signaling for mobility of MBS services for UEs in RRC Connected State is shown in FIG. 18. In some examples, the RAN may configure a set of radio resource management (RRM) measurement and reporting for MBS services which may be different from those configured for unicast services. The RRM measurement configuration parameters for MBS and/or unicast services and the measurement reports (e.g., a combined report for MBS and Unicast services/sessions or different reports for the MBS and Unicast services/sessions) may be used for the mobility decisions.

In some examples, for connected mode mobility purposes, the UE may use measurement configuration for unicast as a basis for measurement and reporting to RAN and the unicast and MBS services for the UE may move together from serving to Target Cell.

In some examples, for connected mode mobility measurement purposes, the UE may use both measurement configurations for unicast and those for MBS as basis for measurement reporting and unicast and MBS services may move together from serving to target Cell.

In some examples, for connected mode mobility measurement purposes, the UE may use both measurement configuration for unicast and those for MBS as basis for measurement reporting and unicast and some or all MBS services may not move together from serving to target Cell.

In some examples, for connected mode mobility/service continuity purposes, the MBS service may be received in the source cell while unicast services move to the target cell.

In some examples, when MBS services are not be available in the target cell, the MBS services may be received from current cell with a Dual Active Protocol Stack (DAPS) mobility process.

In some examples, when MBS services are be available in the target cell but they may be received from current cell without RRC connection, the UE may move to inactive or idle state for MBS in the current cell.

In some examples, the MBS configuration and context in the RAN may include some QoS attributes related to reliability, service continuity and mobility issue per UE. Such context may be defined for each MBS service bundle for the UE. Example MBS context may comprise one or more of set of MBS Services, service continuity into adjacent cells, allowing UE to receive MBS service in Inactive/Idle Mode, HARQ and CSI Feedback Configuration, latest PDCP sequence number (SN) delivered for each MBS service, etc.

In some examples, to extend MBS services for a given UE beyond a cell and to support such mobility the RAN level MBS context may be maintained and transferred during a cell change. In some examples, a RAN level MBS context may be maintained and exchanged between cells involved in UEs mobility. In some example, the RAN level MBS context may include sufficient information for target cell to support admission control for target MBS services and configure and provide UE with those services which may require service continuity.

In some examples, the MBS configuration, e.g. MBS control channel (MCCH) configurations and mapping of MBS services to Group RNTI in the target cell may be different than those in the source cell.

In some examples, for the MBS services which require lossless and reliable delivery the information about last MBS data packet delivered to UE may be included in the MBS context.

In some examples, the MBS RAN Context may include the service level identifiers, e.g. temporary mobile group identifier (TMGIs) associate with UE's registered MBS services, QoS/reliability attributes for each MBS service and the last PDCP sequence number delivered to UE.

In some examples, the HO Request Acknowledgement message may include the MBS configuration, e.g. time and frequency resource configuration of MCCHs for available MBS services with service continuity at the target cell if MBS is offered as multicast transmission. This information may be included in HO direction message to UE.

Figure 20:
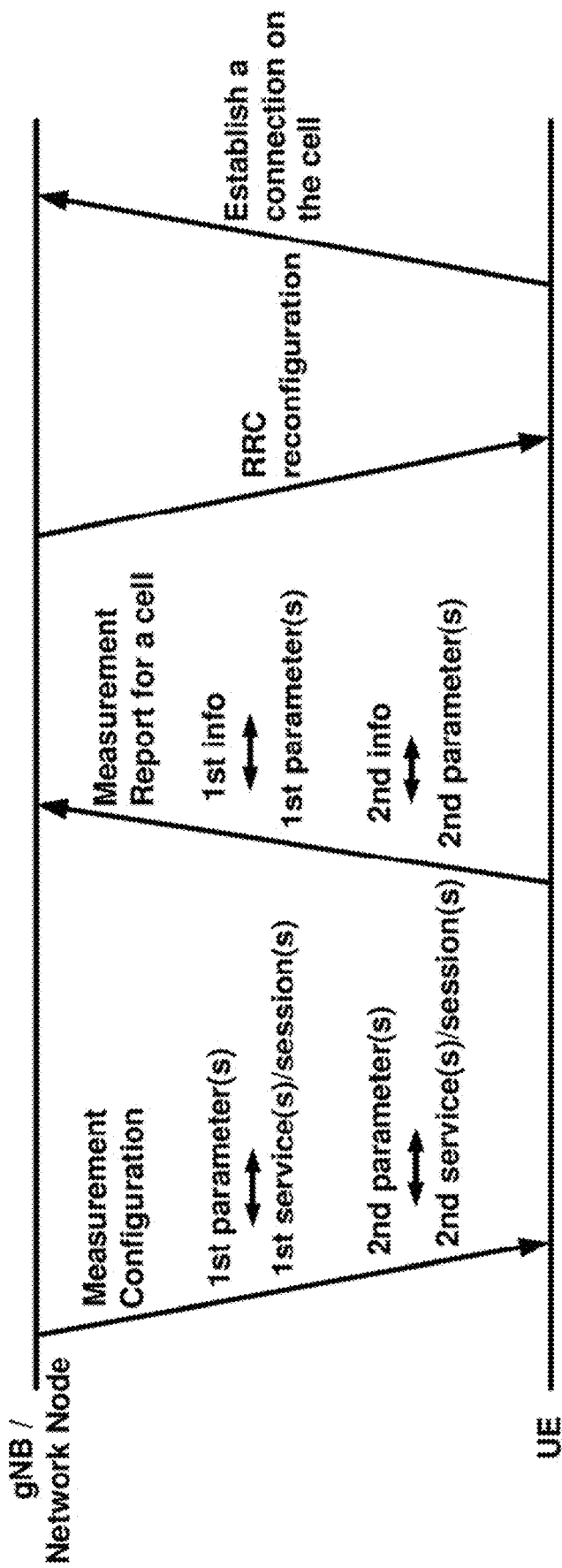
FIG. 20 shows an example process according to some aspects of some of various exemplary embodiments of the present disclosure.

In an example embodiment as shown in FIG. 20, a UE may receive one or more messages (e.g., RRC messages) comprising measurement configuration parameters. The measurement configuration parameters may comprise information applicable for SS/PBCH block(s) intra/inter-frequency measurements and/or CSI-RS intra/inter-frequency measurements. The UE may use the measurement configuration parameters for measuring one or more reference signals and report the measurement information to a network node (e.g., a base station) that may make handover decisions.

The measurement configuration parameters may comprise first measurement configuration parameters and second measurement configuration parameters. The first measurement configuration parameters may be associated with one or more first services/sessions and may be used for handover decisions associated with the one or more first services/sessions. The second measurement configuration parameters may be associated with one or more second services/sessions and may be used for handover decisions associated with the one or more second services/sessions. For example, the first measurement configuration parameters may indicate radio resources for one or more first reference signals for one or more measurements associated with the one or more first services/sessions. The one or more first reference signals may comprise one or more of a first CSI-RS or a first SSB. The first measurement configuration parameters may comprise one or more first reporting configurations for reporting measurements associated with the one or more first services/sessions. For example, the second measurement configuration parameters may indicate radio resources for one or more second reference signals for one or more measurements associated with the one or more second services/sessions. The one or more second reference signals may comprise one or more of a second CSI-RS or a second SSB. The second measurement configuration parameters may comprise one or more second reporting configurations for reporting measurements associated with the one or more second services/sessions.

Figure 19:
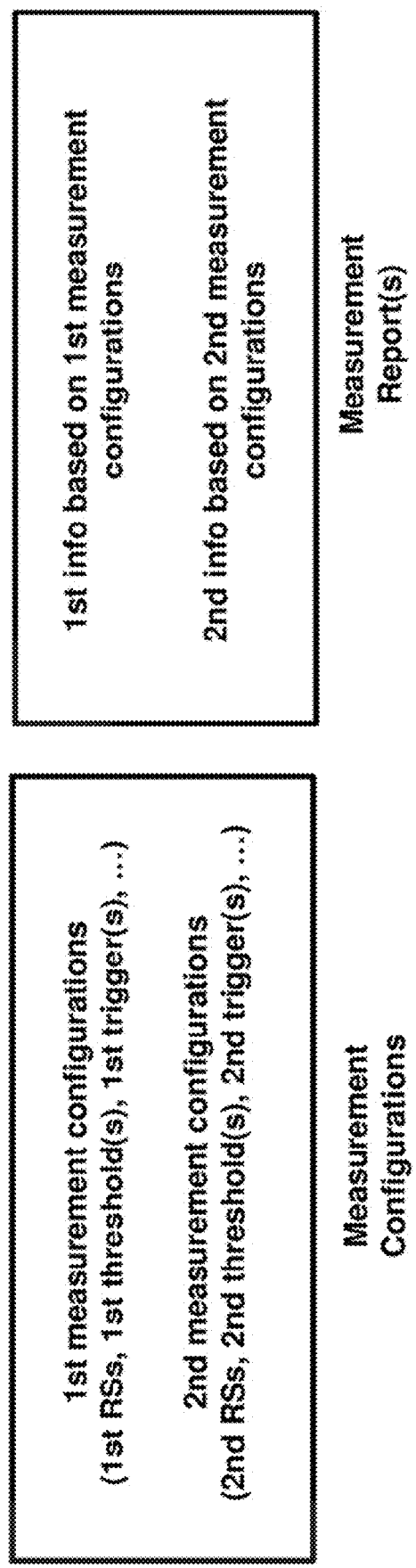
FIG. 19 shows example measurement configuration and report according to some aspects of some of various exemplary embodiments of the present disclosure.

In some examples as shown in FIG. 19, the first measurement configuration parameters and the second measurement configuration parameters may be different and the UE may measure corresponding reference signals for each service(s)/session(s) and compare the measurements with corresponding threshold(s) for triggering events for measurement reports corresponding to the one or more first services/sessions and the one or more second services/sessions.

In some examples, the first measurement configuration parameters and the second measurement configuration parameters may be the same and the UE may measure reference signals for both service(s)/session(s) and compare the measurements with threshold(s) for triggering events for measurement reports for both the one or more first services/sessions and the one or more second services/sessions. In other embodiments, the first and second configuration parameters may be different.

In some examples, the one or more first services/sessions may include a first type of services, such as unicast services/sessions associated with one or more data radio bearers (DRBs). The one or more second services/sessions may comprise a second type of services, such as multicast/broadcast services (e.g., MBS services) associated with one or more multicast/broadcast radio bearers (e.g., one or more MBS radio bearers (MRBs)).

The UE may transmit one or more measurements reports based on the measurement configuration parameters (e.g., the first measurement configuration parameters and the second measurement configuration parameters). The one or more measurement reports may comprise first measurement information for a cell based on the first measurement configuration parameters (e.g., one or more first reference signals, one or more first reporting parameters, one or more first triggering events/thresholds, etc.). The cell may be provided by a second network node/base station different from the current serving network node/base station. The one or more measurement reports may comprise second measurement information for the cell based on the second measurement configuration parameters (e.g., one or more second reference signals, one or more second reporting parameters, one or more second triggering events/thresholds, etc.).

The UE may receive, based on transmitting the one or more measurement reports, from a network node (e.g., a base station), an RRC reconfiguration message comprising configuration parameters of the cell of the second network node/base station. The RRC reconfiguration message may be part of a handover direction/command message indicating a handover to the cell. The UE may establish a connection with the cell based on receiving the RRC reconfiguration message.

In some examples, the UE may receive at least some of the one or more first services/sessions based on the connection with the cell. For example, the UE may receive the one or more second services/sessions based on the connection with the target cell and the UE may receive the one or more first services/sessions via the current cell (e.g., the cell via which the one more first services/sessions and the one or more second services/sessions are currently and before establishing the connection with the target cell being received). For example, the UE may receive the one or more first services/sessions based on the connection with the target cell and the UE may receive the one or more second services/sessions via the current cell.

In some examples, establishing the connection with the target cell may be based on a dual active protocol stack (DAPS) handover. The DAPS handover may be a handover procedure that maintains the source gNB connection after reception of RRC message for handover and until releasing the current cell after successful random access to the target gNB. In case of DAPS handover, the UE may continue the downlink user data reception from the source gNB until releasing the current cell and may continue the uplink user data transmission to the source gNB until successful random access procedure to the target gNB. In some examples, the UE may receive both of the one or more first services/sessions and the one or more second services/sessions based on the connection with the target cell. For example, both the unicast services and the MBS services may be received via the connection with the cell.

In some examples, the UE may transmit a handover confirmation message. The UE may transmit the handover confirmation message to a target network node (e.g., a target base station). The handover confirmation message may comprise an RRC reconfiguration complete message.

Figure 21:
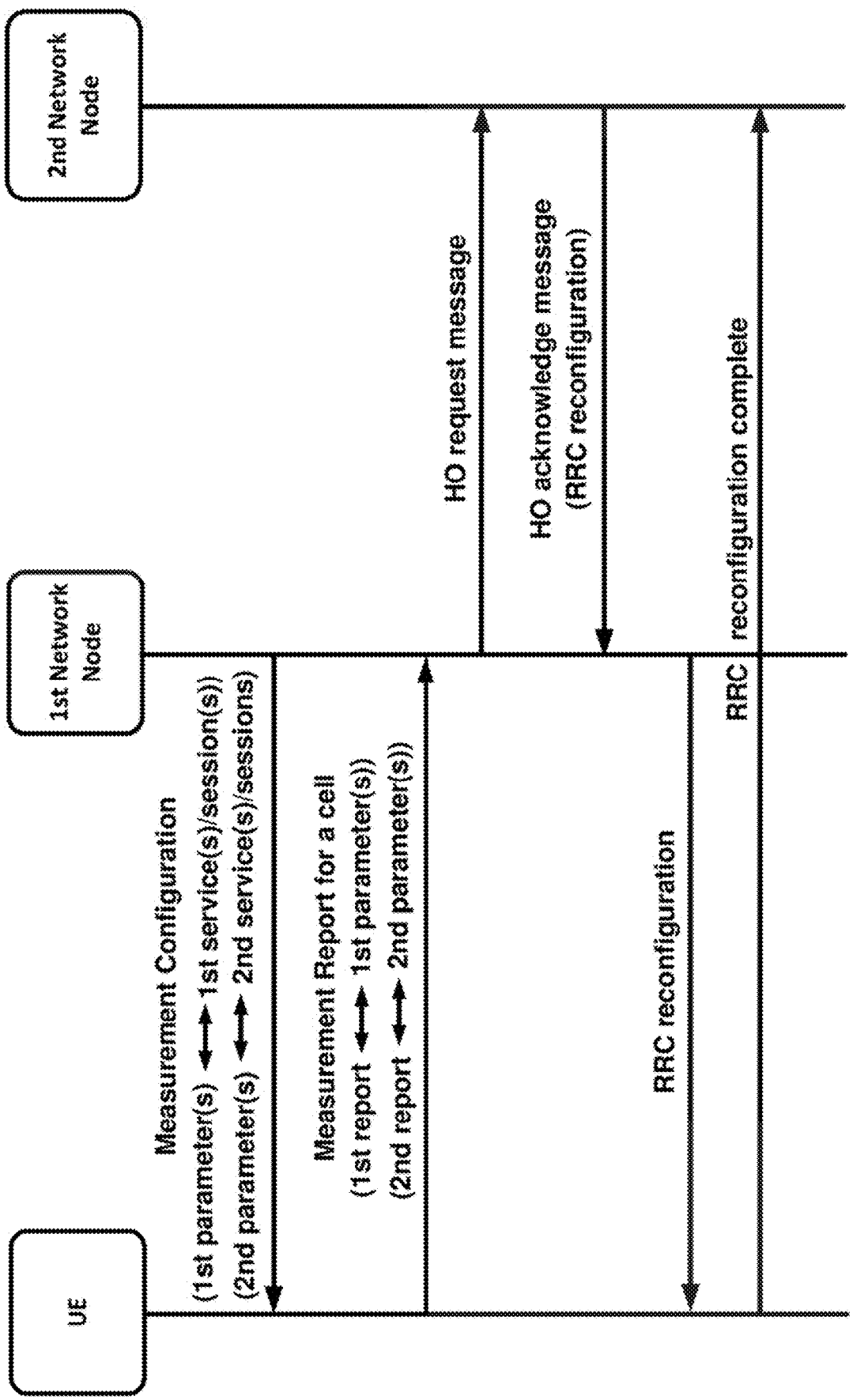
FIG. 21 shows an example process according to some aspects of some of various exemplary embodiments of the present disclosure.

In an example embodiment as shown in FIG. 21, a first network node (e.g., a first base station or a first distributed unit (DU)) may transmit one or more messages (e.g., RRC messages) comprising measurement configuration parameters to a UE. The measurement configuration parameters may comprise the one or more first measurement configuration parameters and one or more second measurement configuration parameters. The one or more first measurement configuration parameters may be associated with the one or more first services/sessions (e.g., the unicast services/sessions) and the one or more second measurement configuration parameters may be associated with the one or more second services/sessions (e.g., the MBS services/sessions). In some examples, the one or more first measurement configuration parameters may comprise one or more first thresholds or one or more first handover triggers and the second measurement configuration parameters may comprise one or more second thresholds or one or more second handover triggers. In some examples, the one or more first services/sessions (e.g., unicast services/sessions) may be associated with one or more first antenna ports and the one or more second services/sessions may be associated with one or more second antenna ports.

The first network node may receive one or more measurement reports from the UE. The one or more measurement reports may comprise first measurement information of a cell and second measurement information of the cell. The first measurement information may be based on the first measurement configuration parameters and/or may be associated with the one or more first services/sessions (e.g., the unicast services/sessions). The second measurement configuration parameters may be based on the one or more second measurement configuration parameters and/or may be based on the one or more second services/sessions (e.g., the MBS services/sessions). In some example, some of the measurement information of the first measurement information and/or the second measurement information may be beam related. For example, quality of certain beams of the cell provided by the second network node. In some examples, some of the beams in the second network node may be for MBS service delivery and the first network node may take into account beam-level measurement information in handover decisions for the MBS services/sessions.

The first network node may make a handover decision based on the one or more measurement reports (e.g., the first measurement information and/or the second measurement information) and may transmit a handover request message to a second network node (e.g., a second base station or a second DU). The second network node may make determine an admission decision based on an admission control process and the information included in the handover request message received from the first network node. The second network node may transmit a handover acknowledge message to the first network node based on the admission control process. The admission control process may be based on the UE context (described below in more detail) received by the second network node from the first network node (e.g., in the handover request message). The handover acknowledge message may comprise an RRC reconfiguration message. The RRC reconfiguration message may comprise configuration parameters of the cell in the second network node. The RRC reconfiguration message may comprise configuration parameters associated with the one or more first services/sessions (e.g., unicast services/sessions) and the one or more second services/sessions (e.g., the MBS services/sessions). For example, the RRC reconfiguration message may comprise resources for MBS control channels on the cell provided by the second network node, reference signals configuration parameters associated with the one or more second services/sessions (e.g., MBS services/sessions) in the second network node, etc.

In some examples, the one or more MBS services may comprise one or more first MBS services that require service continuity and or more second MBS services that do not require service continuity or have more relaxed requirements on service continuity. The level of required service continuity for an MBS service may be a configurable parameter and/or a QoS parameter associated with the MBS service.

The first network node may transmit the RRC reconfiguration message, received via the handover acknowledge message from the second network node, to the first network node. The RRC reconfiguration message may be transmitted to the UE as part of a handover direction/command. The UE may establish a connection on the cell with the second network node based on the reception of the RRC reconfiguration message.

In some examples, the first network node may be a first base station and the second network node may be a second base station. In some examples, the first network node and/or the second network node may be a DU. For example, the first network node may be a first DU associated with a base station and the second network node may be a second DU associated with the base station. For example, the first network node may be a first DU associated with a first base station and the second network node may be a second DU associated with a second base station.

In some examples, the handover request message may comprise a UE context. The UE context may comprise first UE context information and second UE context information. The first UE context information may be associated with the one or more first services/sessions (e.g., the unicast services/sessions) and the second UE context information may be associated with the one or more second services/sessions (e.g., the MBS services/sessions). For example, the first UE context information may comprise first configuration parameters, such as data radio bearers configuration parameters, DRB identifiers, etc. associated with the one or more first services/sessions (e.g., the unicast services/sessions) and the second UE context information may comprise second configuration parameters, such as radio bearers (e.g., MRBs) associated with the one or more second services/sessions (e.g., MBS services/sessions). The second UE context information may comprise one or more of one or more MBS service identifiers (such as TMGIs, etc.), one or more RAN identifiers such as RNTIs (such as G-RNTIs, etc.) associated with the one or more MBS services, service continuity requirements associated with the one or more MBS services (for example, whether an MBS service requires service continuity or not) and/or one or more first MBS services in the one or more MBS services that require service continuity, whether the UE is capable or is allowed/configured to receive MBS services in RRC Inactive state or RRC Idle state, HARQ requirements for the MBS service (for example whether HARQ is configured for an MBS service or not), channel state information (CSI) feedback requirements configured for an MBS service (for example, whether CSI feedback is configured for a MBS service), configuration parameters one or more control channels associated with the one or more MBS services (e.g., one or more MCCHs), one or more QoS related information associated with the one or more MBS services, information associated with a latest MBS data packet (e.g., PDCP packet, MAC packet, etc.) delivered to the UE such as a latest PDCP sequence number (SN), etc.

In an embodiment, a user equipment (UE) may receive measurement configuration parameters comprising: one or more first measurement configuration parameters for handover decisions associated with one or more first services/sessions; and one or more second measurement configuration parameters for handover decisions associated with one or more second services/sessions. The UE may transmit one or more measurement reports comprising: first measurement information for a cell based on the one or more first measurement configuration parameters; and second measurement information for the cell based on the one or more second measurement configuration parameters. The UE may receive a radio resource management (RRC) reconfiguration message indicating handover to the cell. The UE may establish a connection with the cell based on receiving the RRC reconfiguration messages.

In some embodiments, the one or more first services/sessions comprise unicast services/sessions associated with one or more data radio bearers; and the one or more second services/sessions comprise multicast broadcast services (MBS) services/sessions associated with one or more MBS bearers.

In some embodiments, the UE may receive at least some of the one or more first services/sessions and the one or more second services/sessions based on the connection with the cell. In some embodiments, the UE may receive the one or more second services/sessions based on the connection with the cell; and the UE may receive the one or more first services/sessions via a current serving cell. In some embodiments, the UE may receive the one or more first services/sessions based on the connection with the cell; and the UE may receive the one or more second services/sessions via a current serving cell. In some embodiments, the establishing the connection with the cell may be based on a dual active protocol stack (DAPS). In some embodiments, the UE may receive the one or more first services/sessions and the one or more second services/sessions based on the connection with the cell.

In some embodiments, the first measurement configuration parameters and the second measurement configuration parameters may be the same.

In some embodiments, the first measurement configuration parameters and the second measurement configuration parameters may be different.

In some embodiments, the first measurement configuration parameters may be for measurements associated with one or more first reference signals; and the second measurement configuration parameters may be for measurements associated with one or more second reference signals. In some embodiments, the one or more first reference signals may comprise one or more of a first channel state information reference signal (CSI-RS) and a first synchronization signal block (SSB); and the one or more second reference signals comprise one or more of a second CSI-RS and a second SSB.

In some embodiments, the UE may transmit a handover confirmation message may comprise an RRC reconfiguration complete message to a target base station.

In an embodiment, a first network node may transmit to a user equipment (UE), configuration parameters comprising: one or more first measurement configuration parameters for handover decisions associated with one or more first services/sessions; and one or more second measurement configuration parameters for handover decisions associated with one or more second services/sessions. The first network node may receive from the UE, one or more measurement reports comprising: first measurement information for a cell based on the one or more first measurement configuration parameters; and second measurement information for the cell based on the one or more second measurement configuration parameters. The first network node may transmit, based on the one or more measurement reports, to a second network node, a handover request message. The first network node may receive from the second network node, a handover acknowledgement message comprising a radio resource control (RRC) reconfiguration message. The first network node may transmit to the UE the RRC reconfiguration message indicating handover to the cell for establishing a connection with the cell.

In some embodiments, the first network node may be a first base station; and the second network node is a second base station.

In some embodiments, the first network node may be a first distributed unit (DU) associated with a base station; and the second network node may be a second DU associated with the base station.

In some embodiment, the first network node may be a first DU associated with a first base station; and the second network node may be a second DU associated with a second base station.

In some embodiments, the handover request message may comprise: first UE context information associated with the one or more first services/sessions; and second UE context information associated with the one or more second services/sessions. In some embodiments, the one or more first services/sessions may comprise unicast services/sessions associated with one or more data radio bearers; and the one or more second services/sessions may comprise multicast broadcast services (MBS) services/sessions associated with one or more MBS bearers. In some embodiments, the second UE context information associated with the MBS services/sessions may indicate one or more of: one or more MBS service identifiers for one or more MBS services/sessions; one or more radio access network (RAN) identifiers associated with the one or more MBS services/sessions; service continuity requirements associated with the one or more MBS services/sessions; whether UE is allowed or capable of receiving MBS service in an Inactive state or an Idle state; hybrid automatic repeat request (HARQ) configuration parameters associated with the one or more MBS services/sessions; channel state information feedback requirements associated with the one or more MBS services/sessions; quality of service or reliability requirements associated with the one or more MBS services/sessions; one or more MBS control channel (MCCH) configuration parameters associated with the one or more MBS services/sessions; and one or more information associated with a latest MBS data packet delivered to the UE, the one or more information comprising a latest packet data convergence protocol (PDCP) sequence number (SN) delivered for the one or more MBS service.

In some embodiments, the receiving the handover acknowledgement message may be based on an admission control process in the second network node indicating that at least some of the one or more first services/sessions and the one or more second services/sessions can be provided by the second network node; and the admission control process may be based on the first UE context information and the second UE context information.

In some embodiments, the RRC reconfiguration message may comprise MBS configuration parameters in the second network node. In some embodiments, the MBS configuration parameters in the second network node may indicate radio resources of MBS control channels associated with one or more first MBS services/sessions of the second network node. In some embodiments, the one or more first MBS services/sessions may comprise MBS services/sessions with service continuity.

In some embodiments, the first measurement information or the second measurement information may comprise one or more beam related measurement information.

In some embodiments, the first measurement configuration parameters may comprise one or more first thresholds or one or more first handover triggers; and the second measurement configuration parameters may comprise one or more second thresholds or one or more second handover triggers.

In some embodiments, the one or more first services/sessions may be associated with one or more first antenna ports; and the one or more second services/sessions are associated with the one or more second antenna ports.

The exemplary blocks and modules described in this disclosure with respect to the various example embodiments may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Examples of the general-purpose processor include but are not limited to a microprocessor, any conventional processor, a controller, a microcontroller, or a state machine. In some examples, a processor may be implemented using a combination of devices (e.g., a combination of a DSP and a microprocessor, multiple microprocessors, one or more microprocessors in conjunction with a DSP core, or any other such configuration).

The functions described in this disclosure may be implemented in hardware, software executed by a processor, firmware, or any combination thereof. Instructions or code may be stored or transmitted on a computer-readable medium for implementation of the functions. Other examples for implementation of the functions disclosed herein are also within the scope of this disclosure. Implementation of the functions may be via physically co-located or distributed elements (e.g., at various positions), including being distributed such that portions of functions are implemented at different physical locations.

Computer-readable media includes but is not limited to non-transitory computer storage media. A non-transitory storage medium may be accessed by a general purpose or special purpose computer. Examples of non-transitory storage media include, but are not limited to, random access memory (RAM), read-only memory (ROM), electrically erasable programmable ROM (EEPROM), flash memory, compact disk (CD) ROM or other optical disk storage, magnetic disk storage or other magnetic storage devices, etc. A non-transitory medium may be used to carry or store desired program code means (e.g., instructions and/or data structures) and may be accessed by a general-purpose or special-purpose computer, or a general-purpose or special-purpose processor. In some examples, the software/program code may be transmitted from a remote source (e.g., a website, a server, etc.) using a coaxial cable, fiber optic cable, twisted pair, digital subscriber line (DSL), or wireless technologies such as infrared, radio, and microwave. In such examples, the coaxial cable, fiber optic cable, twisted pair, DSL, or wireless technologies such as infrared, radio, and microwave are within the scope of the definition of medium. Combinations of the above examples are also within the scope of computer-readable media.

As used in this disclosure, use of the term "or" in a list of items indicates an inclusive list. The list of items may be prefaced by a phrase such as "at least one of" or "one or more of". For example, a list of at least one of A, B, or C includes A or B or C or AB (i.e., A and B) or AC or BC or ABC (i.e., A and B and C). Also, as used in this disclosure, prefacing a list of conditions with the phrase "based on" shall not be construed as "based only on" the set of conditions and rather shall be construed as "based at least in part on" the set of conditions. For example, an outcome described as "based on condition A" may be based on both a condition A and a condition B without departing from the scope of this disclosure.

In this specification the terms "comprise", "include" or "contain" may be used interchangeably and have the same meaning and are to be construed as inclusive and open-ending. The terms "comprise", "include" or "contain" may be used before a list of elements and indicate that at least all of the listed elements within the list exist but other elements that are not in the list may also be present. For example, if A comprises B and C, both {B, C} and {B, C, D} are within the scope of A.

The present disclosure, in connection with the accompanied drawings, describes example configurations that are not representative of all the examples that may be implemented or all configurations that are within the scope of this disclosure. The term "exemplary" should not be construed as "preferred" or "advantageous compared to other examples" but rather "an illustration, an instance or an example." By reading this disclosure, including the description of the embodiments and the drawings, it will be appreciated by a person of ordinary skills in the art that the technology disclosed herein may be implemented using alternative embodiments. The person of ordinary skill in the art would appreciate that the embodiments, or certain features of the embodiments described herein, may be combined to arrive at yet other embodiments for practicing the technology described in the present disclosure. Thus, the disclosure is not limited to the examples and designs described herein but is to be accorded the broadest scope consistent with the principles and novel features disclosed herein.

A method of managing a wireless communication system:
  receiving, by a user equipment (UE), measurement configuration parameters comprising:
    one or more first measurement configuration parameters for handover decisions associated with one or more first services, the one or more first services associated with a first type of service; and
    one or more second measurement configuration parameters for handover decisions associated with one or more second services, the one or more second services associated with a second type of service;
  transmitting, by the user equipment (UE), one or more measurement reports comprising:
    first measurement information for a target cell based on the one or more first measurement configuration parameters; and
    second measurement information for the target cell based on the one or more second measurement configuration parameters;
  receiving, by the user equipment (UE), a radio resource control (RRC) reconfiguration message indicating a handover to the target cell; and
  establishing, by the user equipment (UE), a connection with the target cell based on the received the RRC reconfiguration message.

Clause 2. The method of Clause 1, wherein:
  the one or more first services comprise unicast services associated with one or more data radio bearers; and
  the one or more second services comprise multicast broadcast services (MBS) services associated with one or more MBS bearers.

Clause 3. The method of Clause 1 further comprising receiving at least one of a portion of the one or more first services or a portion of the one or more second services based on the connection with the target cell.

Clause 4. The method of Clause 3 further comprising receiving the one or more first services via a current cell.

Clause 5. The method of Clause 3 further comprising receiving the one or more second services via a current cell.

Clause 6. The method of Clause 3, wherein receiving at least one of a portion of the one or more first services or a portion of the one or more second services based on the connection with the target cell includes receiving all of the one or more first services and all the one or more second services based on the connection with the target cell.

Clause 7. The method of Clause 1, wherein establishing the connection with the target cell is based on a dual active protocol stack (DAPS).

Clause 8. The method of Clause 1, wherein the first measurement configuration parameters and the second measurement configuration parameters are the same.

Clause 9. The method of Clause 1, wherein:
the first measurement configuration parameters correspond to measurements associated with one or more first reference signals received from the target cell; and
the second measurement configuration parameters are for measurements associated with one or more second reference signals received from the target cell.

Clause 10. The method of Clause 9, wherein:
the one or more first reference signals comprise one or more of a first channel state information reference signal (CSI-RS) and a first synchronization signal block (SSB); and
the one or more second reference signals comprise one or more of a second CSI-RS and a second SSB.

Clause 11. The method of Clause 1 further comprising transmitting a handover confirmation message comprising an RRC reconfiguration complete message.

Clause 12. A method of managing a wireless communication system comprising
transmitting, by a first network node to a user equipment (UE), measurement configuration parameters comprising:
one or more first measurement configuration parameters for handover decisions associated with one or more first services, the one or more first services associated with a first type of service; and
one or more second measurement configuration parameters for handover decisions associated with one or more second services, the one or more second services associated with a second type of service;
receiving, by the first network node from the UE, one or more measurement reports comprising:
first measurement information for a second node based on the one or more first measurement configuration parameters; and
second measurement information for the second node based on the one or more second measurement configuration parameters;
transmitting, based on the one or more measurement reports, by the first network node to a second network node, a handover request message;
receiving, by the first network node from the second network node, a handover acknowledgement message comprising a radio resource control (RRC) reconfiguration message, in response to the handover request massage;
transmitting, by the first network node to the UE, the RRC reconfiguration message indicating handover to the second node for establishing a connection with the second node by the UE.

Clause 13. The method of Clause 12, wherein:
the first network node is a first base station; and
the second network node is a second base station.

Clause 14. The method of Clause 12, wherein:
the first network node is a first distributed unit (DU) associated with a base station; and
the second network node is a second DU associated with the base station.

Clause 15. The method of Clause 12, wherein:
the first network node is a first distributed unit (DU) associated with a first base station; and
the second network node is a second DU associated with a second base station.

Clause 16. The method of Clause 12, wherein the handover request message comprises:
first user equipment (UE) context information associated with the one or more first services; and
second user equipment (UE) context information associated with the one or more second services.

Clause 17. The method of Clause 16, wherein:
the one or more first services comprise unicast services associated with one or more data radio bearers; and
the one or more second services comprise multicast broadcast service (MBS) services associated with one or more MBS bearers.

Clause 18. The method of Clause 16, wherein the second UE context information associated with the multicast broadband service (MBS) services indicate one or more of:
one or more MBS services identifiers for one or more MBS services;
one or more radio access network (RAN) identifiers associated with the one or more MBS services;
service continuity requirements associated with the one or more MBS services;
whether the user equipment (UE) is allowed or capable of receiving MBS services in an Inactive state or an Idle state;
hybrid automatic repeat request (HARQ) configuration parameters associated with the one or more MBS services;
channel state information feedback requirements associated with the one or more MBS services;
quality of service (QoS) or reliability requirements associated with the one or more MBS services;
one or more MBS control channel (MCCH) configuration parameters associated with the one or more MBS services; and
one or more information associated with a latest MBS data packet delivered to the UE, the one or more information comprising a latest packet data convergence protocol (PDCP) sequence number (SN) delivered for the one or more MBS service.

Clause 19. The method of Clause 12, wherein:
the receiving the handover acknowledgement message is based on an admission control process in the second network node indicating that at least some of the one or more first services and the one or more second services can be provided by the second network node; and
the admission control process is based on the first user equipment (UE) context information and the second UE context information.

Clause 20. The method of Clause 12, wherein the radio resource control (RRC) reconfiguration message comprises MBS configuration parameters in the second network node.

Clause 21. The method of Clause 20, wherein the multicast broadband service (MBS) configuration parameters in the second network node indicate radio resources of MBS control channels associated with one or more first MBS services of the second network node.

Clause 22. The method of Clause 21, wherein the one or more first multicast broadband service (MBS) services comprise MBS services with service continuity.

Clause 23. The method of Clause 12, wherein the first measurement information or the second measurement information comprise one or more beam related measurement information.

Clause 24. The method of Clause 12, wherein:
the first measurement configuration parameters comprise one or more first thresholds or one or more first handover triggers; and
the second measurement configuration parameters comprise one or more second thresholds or one or more second handover triggers.

Clause 25. The method of Clause 12, wherein:
the one or more first services are associated with one or more first antenna ports; and
the one or more second services are associated with the one or more second antenna ports.

Clause 26. An apparatus for utilization in wireless communications comprising:
an antenna for use in transmission of electromagnetic signals;
a memory for maintaining computer-readable code; and
a processor for executing the computer-readable code that causes the apparatus to:
receive measurement configuration parameters comprising:
one or more first measurement configuration parameters for handover decisions associated with one or more first services, the one or more first services associated with a first type of service; and
one or more second measurement configuration parameters for handover decisions associated with one or more second services, the one or more second services associated with a second type of service;
transmit one or more measurement reports comprising:
first measurement information for a target node based on the one or more first measurement configuration parameters; and
second measurement information for the target node based on the one or more second measurement configuration parameters;
receive a radio resource control (RRC) reconfiguration message indicating a handover to the target node; and
establish a connection with the target node based on the received the RRC reconfiguration message.

Clause 27. The apparatus of Clause 26, wherein:
the one or more first services comprise unicast services associated with one or more data radio bearers; and
the one or more second services comprise multicast broadcast services (MBS) services associated with one or more MBS bearers.

Clause 28. The apparatus of Clause 26, wherein the apparatus is further configured to receive at least one of a portion of the one or more first services or a portion of the one or more second services based on the connection with the target node.

Clause 29. The apparatus of Clause 26, wherein the apparatus is further configured to receive the one or more first services via a current node.

Clause 30. The apparatus of Clause 26, wherein the apparatus is further configured to receive the one or more second services via a current node.

Clause 31. The apparatus of Clause 26, wherein the apparatus is further configured to receive all of the one or more first services and all the one or more second services based on the connection with the target node.

Clause 32. The apparatus of Clause 26, wherein the apparatus establishes a connection with the target node based on a dual active protocol stack (DAPS).

Clause 33. The apparatus of Clause 26, wherein the first measurement configuration parameters and the second measurement configuration parameters are different.

Clause 34. The apparatus of Clause 26, wherein:
the first measurement configuration parameters correspond to measurements associated with one or more first reference signals received from the target node; and
the second measurement configuration parameters are for measurements associated with one or more second reference signals received from the target node.

Clause 35. The apparatus of Clause 26, wherein:
the one or more first reference signals comprise one or more of a first channel state information reference signal (CSI-RS) and a first synchronization signal block (SSB); and
the one or more second reference signals comprise one or more of a second CSI-RS and a second SSB.

Clause 36. The apparatus of Clause 26, wherein the apparatus is further configured to transmit a handover confirmation message comprising an RRC reconfiguration complete message.

Clause 37. An apparatus for utilization in wireless communications comprising:
an antenna for use in transmission of electromagnetic signals;
a memory for maintaining computer-readable code; and
a processor for executing the computer-readable code that causes the apparatus to
transmit measurement configuration parameters comprising:
one or more first measurement configuration parameters for handover decisions associated with one or more first services, the one or more first services associated with a first type of service; and
one or more second measurement configuration parameters for handover decisions associated with one or more second services, the one or more second services associated with a second type of service;
transmit one or more measurement reports comprising:
first measurement information for a second node based on the one or more first measurement configuration parameters; and
second measurement information for the second node based on the one or more second measurement configuration parameters;
transmit, based on the one or more measurement reports a handover request message;
receive a handover acknowledgement message comprising a radio resource control (RRC) reconfiguration message, in response to the handover request massage;
transmit the RRC reconfiguration message indicating handover to the second node for establishing a connection with the second node by the UE.

Clause 38. The apparatus of Clause 37, wherein:
the first network node is a first base station; and
the second network node is a second base station.

Clause 39. The apparatus of Clause 37, wherein:
the first network node is a first distributed unit (DU) associated with a base station; and
the second network node is a second DU associated with the base station.

Clause 40. The apparatus of Clause 37, wherein:
the first network node is a first distributed unit (DU) associated with a first base station; and
the second network node is a second DU associated with a second base station.

Clause 41. The apparatus of Clause 37, wherein the handover request message comprises:
first user equipment (UE) context information associated with the one or more first services; and
second user equipment (UE) context information associated with the one or more second services.

Clause 42. The apparatus of Clause 41, wherein:
the one or more first services comprise unicast services associated with one or more data radio bearers; and
the one or more second services comprise multicast broadcast service (MBS) services associated with one or more MBS bearers.

Clause 43. The apparatus of Clause 37, wherein:
the receiving the handover acknowledgement message is based on an admission control process in the second network node indicating that at least some of the one or more first services and the one or more second services can be provided by the second network node; and
the admission control process is based on the first user equipment (UE) context information and the second UE context information.

Clause 44. The apparatus of Clause 37, wherein the radio resource control (RRC) reconfiguration message comprises MBS configuration parameters in the second network node.

Clause 45. The apparatus of Clause 44, wherein the multicast broadband service (MBS) configuration parameters in the second network node indicate radio resources of MBS control channels associated with one or more first MBS services of the second network node.

Clause 46. The apparatus of Clause 37, wherein the one or more first multicast broadband service (MBS) services comprise MBS services with service continuity.

Clause 47. The apparatus of Clause 37, wherein the first measurement information or the second measurement information comprise one or more beam related measurement information.

Clause 48. The apparatus of Clause 37, wherein:
the first measurement configuration parameters comprise one or more first thresholds or one or more first handover triggers; and
the second measurement configuration parameters comprise one or more second thresholds or one or more second handover triggers.

Clause 49. The apparatus of Clause 37, wherein:
the one or more first services are associated with one or more first antenna ports; and
the one or more second services are associated with the one or more second antenna ports.

The invention claimed is:

1. A method of managing a wireless communication system, comprising:
receiving, by a user equipment (UE), a radio resource control (RRC) reconfiguration message, the RRC reconfiguration message comprising:
one or more first measurement configuration parameters associated with one or more unicast protocol data unit (PDU) sessions, and
one or more second measurement configuration parameters associated with one or more multicast broadcast services (MBS) sessions, and
transmitting, by the UE, one or more measurement reports, the one or more measurement reports comprising at least one of:
first measurement information associated with the one or more first measurement configuration parameters; or
second measurement information associated with the one or more second measurement configuration parameters.

2. The method of claim 1, wherein the one or more unicast PDU sessions are received via one or more data radio bearers (DRBs), and the one or more MBS sessions are received via one or more MBS radio bearers (MRBs).

3. A method of managing a wireless communication system, comprising:
transmitting, by a network node, a radio resource control (RRC) reconfiguration message, the RRC reconfiguration message comprising:
one or more first measurement configuration parameters associated with one or more unicast protocol data unit (PDU) sessions, and
one or more second measurement configuration parameters associated with one or more multicast broadcast services (MBS) sessions; and
receiving, by the network node, one or more measurement reports, the one or more measurement reports comprising at least one of:
first measurement information associated with the one or more first measurement configuration parameters, or
second measurement information associated with the one or more second measurement configuration parameters.

4. The method of claim 3, wherein the one or more unicast PDU sessions are transmitted via one or more data radio bearers (DRBs), and the one or more MBS sessions are transmitted via one or more MBS radio bearers (MRBs).

5. A user equipment (UE), comprising:
receiving circuitry configured to receive a radio resource control (RRC) reconfiguration message, the RRC reconfiguration message comprising:
one or more first measurement configuration parameters associated with one or more unicast protocol data unit (PDU) sessions, and
one or more second measurement configuration parameters associated with one or more multicast broadcast services (MBS) sessions; and
transmitting circuitry configured to transmit one or more measurement reports, the one or more measurement reports comprising at least one of:
first measurement information associated with the one or more first measurement configuration parameters, or
second measurement information associated with the one or more second measurement configuration parameters.

6. A network node, comprising:
transmitting circuitry configured to transmit a radio resource control (RRC) reconfiguration message, the RRC reconfiguration message comprising:
one or more first measurement configuration parameters associated with one or more unicast protocol data unit (PDU) sessions, and
one or more second measurement configuration parameters associated with one or more multicast broadcast services (MBS) sessions; and receiving circuitry configured to receive one or more measurement reports, the one or more measurement reports comprising at least one of:
  first measurement information associated with the one or more first measurement configuration parameters, or
  second measurement information associated with the one or more second measurement configuration parameters.

* * * * *